United States Patent
Fujimura et al.

(10) Patent No.: US 7,057,800 B2
(45) Date of Patent: Jun. 6, 2006

(54) RAMAN AMPLIFYING DEVICE AND RAMAN AMPLIFYING SYSTEM

(75) Inventors: Koji Fujimura, Tokyo (JP); Masami Ikeda, Tokyo (JP); Misao Sakano, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/096,092

(22) Filed: Apr. 1, 2005

(65) Prior Publication Data

US 2005/0179991 A1    Aug. 18, 2005

Related U.S. Application Data

(63) Continuation of application No. PCT/JP03/10981, filed on Aug. 28, 2003.

(30) Foreign Application Priority Data

Oct. 2, 2002    (JP) .......................... 2002-290368

(51) Int. Cl.
*H01S 3/00*    (2006.01)

(52) U.S. Cl. ................. 359/334; 359/337.1; 359/337.4

(58) Field of Classification Search ................ 359/334, 359/337.1, 337.4
See application file for complete search history.

(56) References Cited

U.S. PATENT DOCUMENTS 6,556,341 B1 *   4/2003   Krummrich et al. ......... 359/334
6,738,180 B1     5/2004   Hirasawa et al.
6,862,135 B1 *   3/2005   Evans et al. ............. 359/337.1

FOREIGN PATENT DOCUMENTS

| EP | 1 170 888 A1 | 1/2002 |
| EP | 1 187 276 A2 | 3/2002 |
| WO | WO 00/49721 | 8/2000 |

OTHER PUBLICATIONS

Toshiki Tanaka, et al., "Gain-Flattened Raman Amplification Scheme for WDM Transmission", Optical Amplifiers and There Application, Jul. 2001, OTuA3-1-OTuA3-3.

* cited by examiner

*Primary Examiner*—Mark Hellner
(74) *Attorney, Agent, or Firm*—Oblon, Spivak, McClelland, Maier & Neustadt, P.C.

(57) ABSTRACT

A Raman amplifying device includes a plurality of Raman amplifiers having a gain wavelength characteristic with a gain peak at which an amplification gain becomes the largest, including a first Raman amplifier having a gain wavelength characteristic with a plurality of gain peaks including a first gain peak and a second gain peak adjacent to the first gain peak; a second Raman amplifier having a gain wavelength characteristic with at least one gain peak including a third gain peak between the first gain peak and the second gain peak; and a third Raman amplifier having a gain wavelength characteristic with a fourth gain peak between the first gain peak and the third gain peak, the fourth gain peak forming an arithmetic sequence between the first gain peak and the third gain peak.

10 Claims, 17 Drawing Sheets

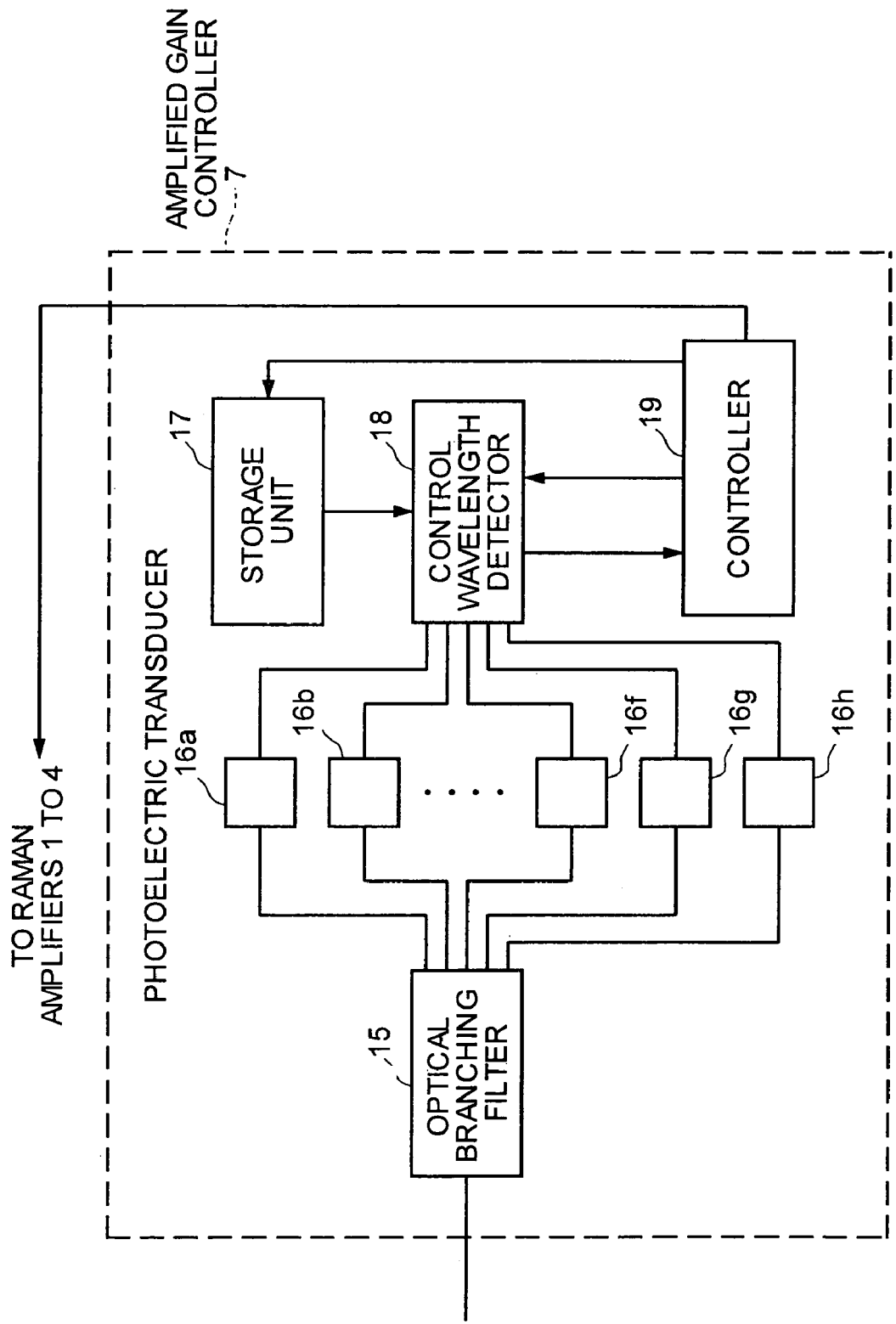

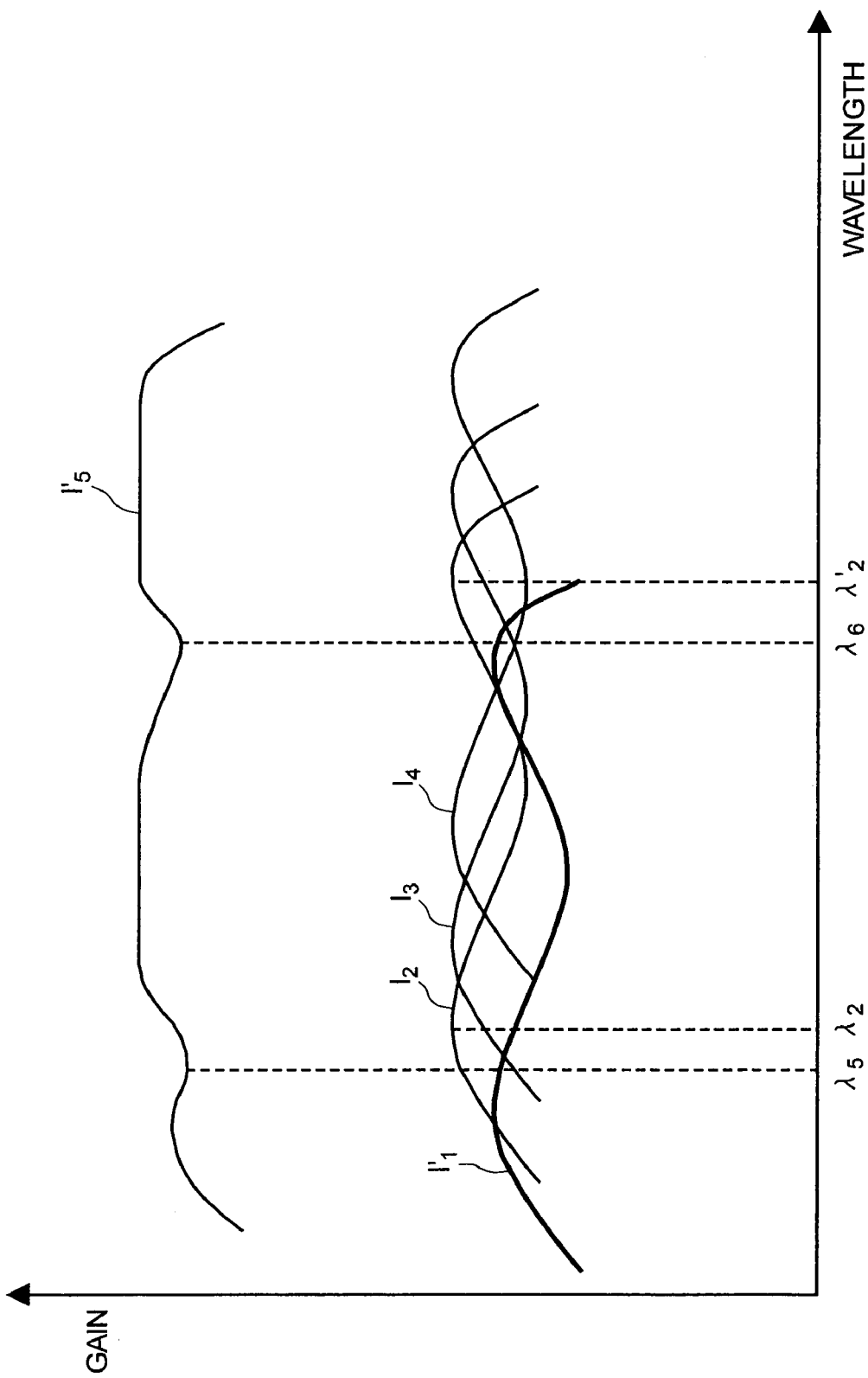

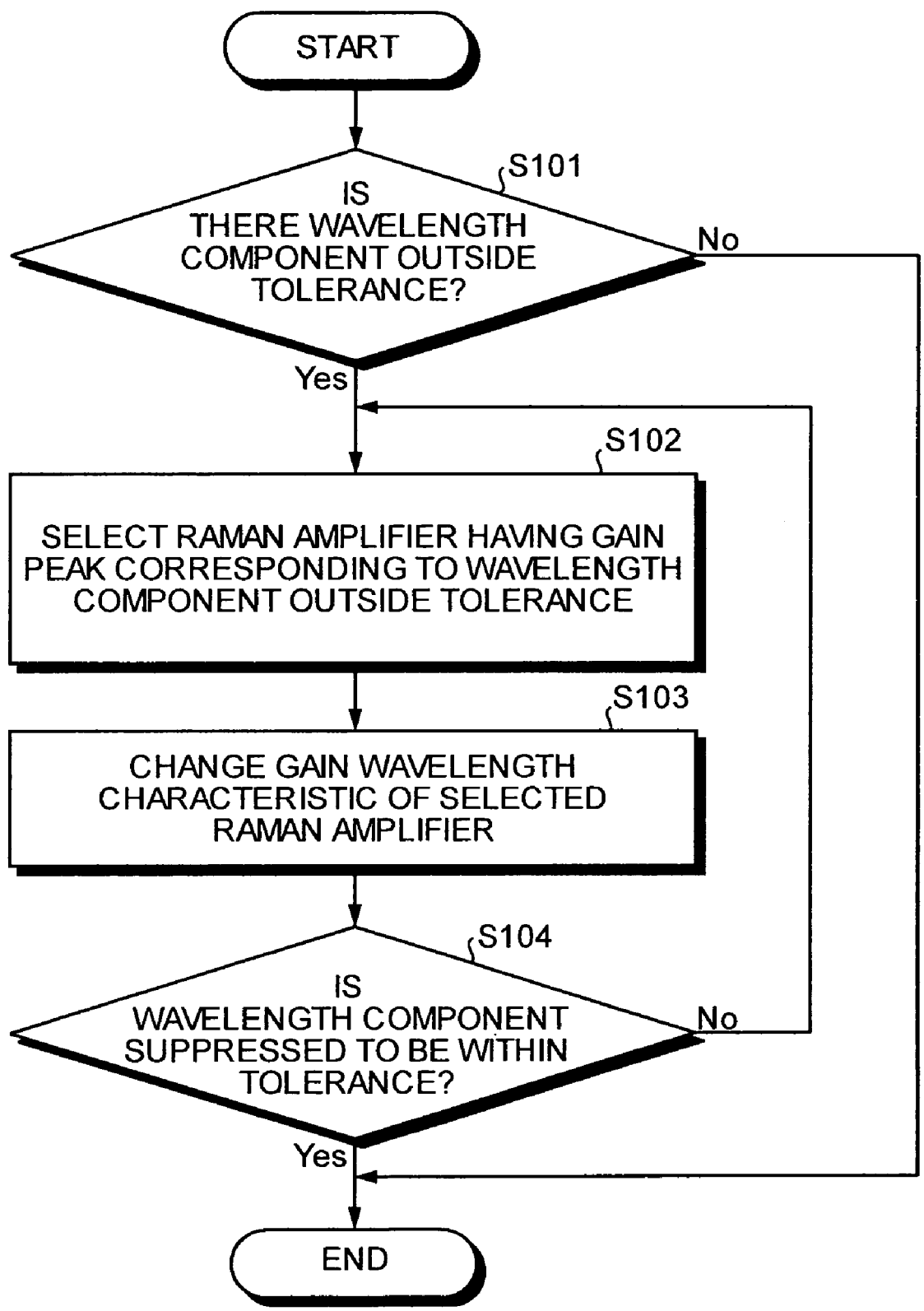

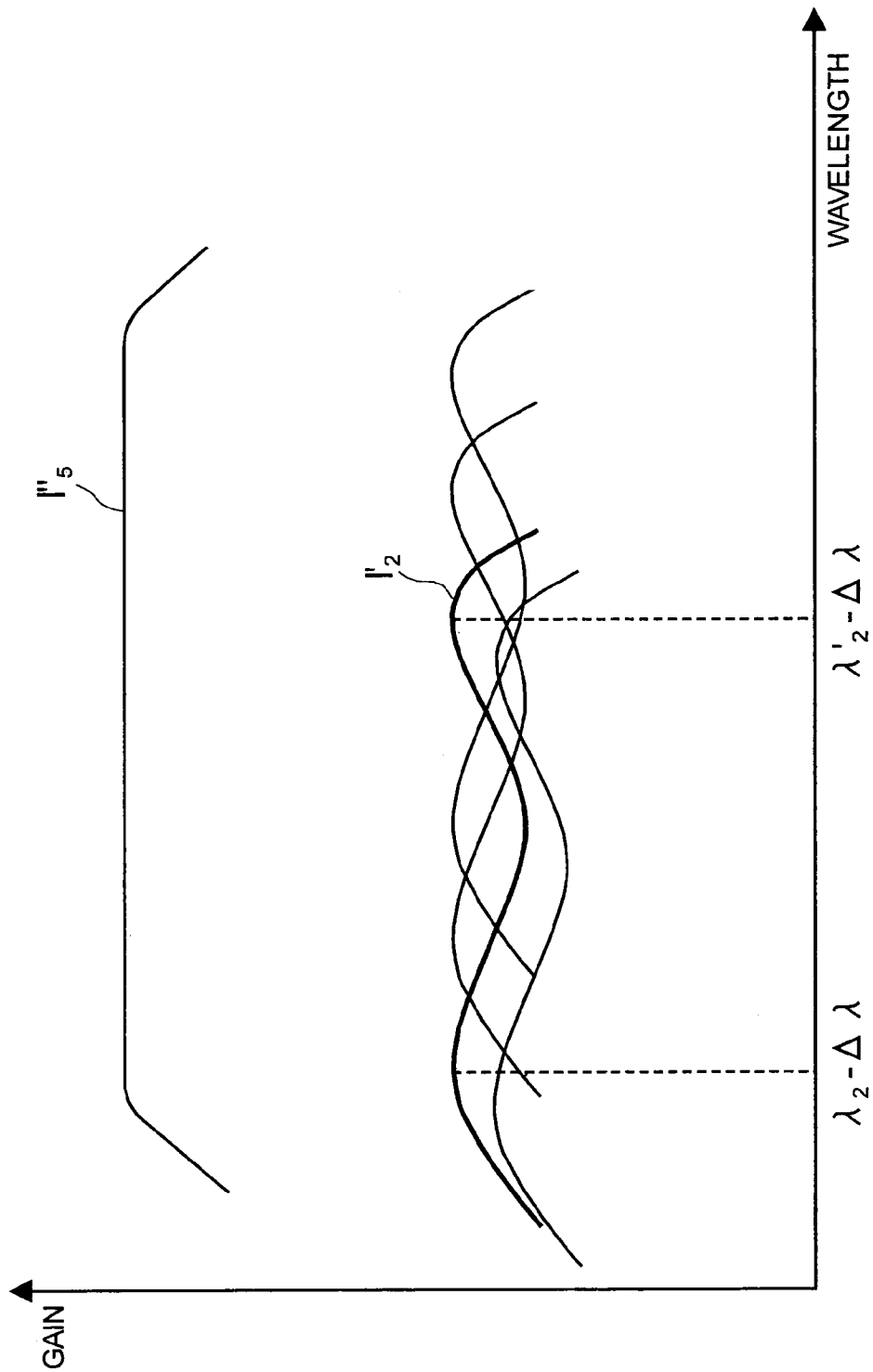

FIG.9A

| | RAMAN AMPLIFIER A | RAMAN AMPLIFIER B | RAMAN AMPLIFIER C | RAMAN AMPLIFIER D | RAMAN AMPLIFIER E |
|---|---|---|---|---|---|
| $\lambda_{p1}$ | 1424.192nm | 1428.501nm | 1432.811nm | 1419.883nm | 1415.573nm |
| $\lambda_{p2}$ | 1439.925nm | 1444.234nm | 1448.544nm | 1435.616nm | 1431.306nm |
| $\lambda_{p3}$ | 1457.426nm | 1461.735nm | 1466.045nm | 1453.117nm | 1448.807nm |
| $\lambda_{p4}$ | 1488.834nm | 1493.143nm | 1497.453nm | 1484.525nm | 1480.215nm |

FIG.9B

| | PEAK INTENSITY |
|---|---|
| $\lambda_{p1}$ | 186 mW |
| $\lambda_{p2}$ | 142 mW |
| $\lambda_{p3}$ | 112 mW |
| $\lambda_{p4}$ | 179 mW |

FIG.10

|  | RAMAN AMPLIFIER A | RAMAN AMPLIFIER B | RAMAN AMPLIFIER C | RAMAN AMPLIFIER D | RAMAN AMPLIFIER E |
|---|---|---|---|---|---|
| $\lambda_{p1}$ | 1424.192nm | 1428.501nm | 1432.811nm | 1419.883nm | 1415.373nm |
| $\lambda_{p2}$ | 1439.925nm | 1444.034nm | 1448.744nm | 1435.816nm | 1431.306nm |
| $\lambda_{p3}$ | 1457.426nm | 1461.735nm | 1465.845nm | 1453.117nm | 1449.007nm |
| $\lambda_{p4}$ | 1488.834nm | 1493.143nm | 1497.453nm | 1484.725nm | 1480.415nm |

RAMAN AMPLIFYING DEVICE AND RAMAN AMPLIFYING SYSTEM

CROSS-REFERENCE TO RELATED APPLICATIONS

This application is a continuation of PCT/JP03/10981 filed on Aug. 28, 2003, the entire content of which are incorporated herein by reference.

BACKGROUND OF THE INVENTION

1) Field of the Invention

The present invention relates to a Raman amplifying device including a plurality of Raman amplifiers having a gain characteristic with a gain peak at which an amplification gain is maximized.

2) Description of the Related Art

Development of optical communication systems that have a large transmission capacity and can perform long distance transmission is under way, with the recent development of optical communications such as the Internet. From the standpoint of increasing the transmission capacity, a wavelength division multiplexing (WDM) method and a dense wavelength division multiplexing (DWDM) method have been proposed and put into practical use. The WDM method is a communication method in which a plurality of signal lights having a different wavelength is transmitted in the same optical transmission path, and the DWDM method is a communication method in which more signal lights than in the WDM method are transmitted in the same optical transmission path. By adopting these communication methods, the quantity of signals that can be transmitted at the same time increases, thereby enabling an increase in the transmission capacity in the optical communications.

From the standpoint of realizing the long distance transmission, it is widely practiced to arrange optical amplifying devices that amplify the intensity of the signal light attenuated on the way of transmission through the optical communication path. As the optical amplifying device, an erbium doped fiber amplifier (EDFA) and a Raman amplifying device using Raman amplification are well known. Particularly, the Raman amplifying device can amplify a light of an optional wavelength by changing the wavelength of a pump light, thereby having an advantage in that there is a wide room for choice of the signal light.

When an optical communication system combining the WDM method or the DWDM method with the Raman amplification is to be realized, it is important to provide an amplification gain of the same level with respect to signal lights having transmitted through the same transmission path and having a different wavelength from each other. Particularly, when a plurality of Raman amplifying devices is arranged on the transmission path, since a gain deviation of the individual Raman amplifying device is accumulated, flattening of the gain wavelength characteristic of the optical amplifier is an important issue.

Therefore, an example is heretofore disclosed in which one Raman amplifier referred to as a W-type, having a peak (hereinafter, "gain peak") of the gain wavelength characteristic in a wavelength band of from 1539 to 1579 nanometers, at the opposite ends and substantially at the center of the band, and one Raman amplifier referred to as an M-type, having a gain peak between the gain peaks of the W-type Raman amplifier are combined to form a Raman amplifying device (for example, see Optical Amplifiers and There Application 2001 July OTuA3).

However, flattening of the gain wavelength characteristic cannot be sufficiently realized as a whole, only by the configuration in which two Raman amplifiers are simply combined to simply compensate for peaks and valleys in the respective gain wavelength characteristics.

Furthermore, even when the Raman amplifying device is formed as in the conventional art, when the Raman amplifying device is actually assembled in the optical communication system, the gain wavelength characteristic may not become flat. That is, in the optical communication system in which long distance transmission is performed, a Raman gain coefficient in optical fibers for performing Raman amplification or an attenuation constant of an input pump light may change from the values at the time of designing, due to fluctuations in the temperature or the like in the external environment. Therefore, even if the Raman amplifying device has a flat gain wavelength characteristic at the time of designing, the gain wavelength characteristic may be changed when the optical communication system is actually laid down.

In the actual optical communication system, problems due to a malfunction in a pump light source or the like, which forms the Raman amplifying device, should be taken into consideration. In the optical communication system laid down in a wide range, determination of the spot having the malfunction is not easy, and repair work may be difficult according to the place of the spot having the malfunction. Therefore, it is desired to provide a mechanism that can maintain the gain deviation in the optical communication system in a certain range, even when a part of the optical communication system has a malfunction.

Furthermore, when a system in which the Raman amplifiers are connected in multiple stages is designed according to the conventional art, it is necessary to design the gain wavelength characteristic of the individual Raman amplifier separately, so that a desired gain wavelength characteristic can be obtained as the entire system. Therefore, there is a problem in that the designing process becomes very complicated and difficult.

The present invention has been achieved in order to solve the above problems in the conventional art, and it is an object of the present invention to realize a Raman amplifying device including a plurality of Raman amplifiers and capable of maintaining the gain deviation within a certain tolerance, and a Raman amplifying system combining a plurality of Raman amplifying devices.

SUMMARY OF THE INVENTION

It is an object of the present invention to solve at least the above problems in the conventional technology.

A Raman amplifying device according to one aspect of the present invention includes a plurality of Raman amplifiers having a gain wavelength characteristic with a gain peak at which an amplification gain becomes the largest including a first Raman amplifier having a gain wavelength characteristic with a plurality of gain peaks including a first gain peak and a second gain peak adjacent to the first gain peak; a second Raman amplifier having a gain wavelength characteristic with at least one gain peak including a third gain peak between the first gain peak and the second gain peak; and a third Raman amplifier having a gain wavelength characteristic with a fourth gain peak between the first gain peak and the third gain peak, the fourth gain peak forming an arithmetic sequence between the first gain peak and the third gain peak.

A Raman amplifying device according to another aspect of the present invention includes a plurality of Raman amplifiers having a gain wavelength characteristic with a gain peak at which an amplification gain becomes the largest including at least one Raman amplifier having a first gain characteristic; and at least one Raman amplifier having a second gain characteristic shifted from the first gain characteristic by a shift amount determined based on a periodic distribution obtained from sum approximation of periodic functions with respect to the first gain characteristic.

A Raman amplifying system according to still another aspect of the present invention includes a first group including a plurality of Raman amplifiers, each of the Raman amplifiers having a gain peak of a different wavelength; a second group including a plurality of Raman amplifiers connected to an end of the first group, each of the Raman amplifiers having a gain peak of a different wavelength; and an entire gain controller connected to an end of the second group, the entire gain controller classifying the Raman amplifiers belonging to the first and the second groups into a predetermined set to control gain wavelength characteristic.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 5 is a block diagram of the structure of an amplification gain controller constituting the Raman amplifying device according to the first embodiment;

FIG. 6 is a graph of a state in which the gain wavelength characteristic is disturbed in the Raman amplifying device according to the first embodiment;

FIG. 7 is a flowchart of the operation of the amplification gain controller constituting the Raman amplifying device according to the first embodiment;

FIG. 8 is a graph of the gain wavelength characteristic of the Raman amplifying device, flattened by the operation of the amplification gain controller according to the first embodiment;

FIGS. 9A and 9B are tables of the gain wavelength characteristic before the control by the amplification gain controller;

FIG. 10 is a table of the gain wavelength characteristic after the control by an amplification gain controller in an Example;

DETAILED DESCRIPTION

Figure 1:
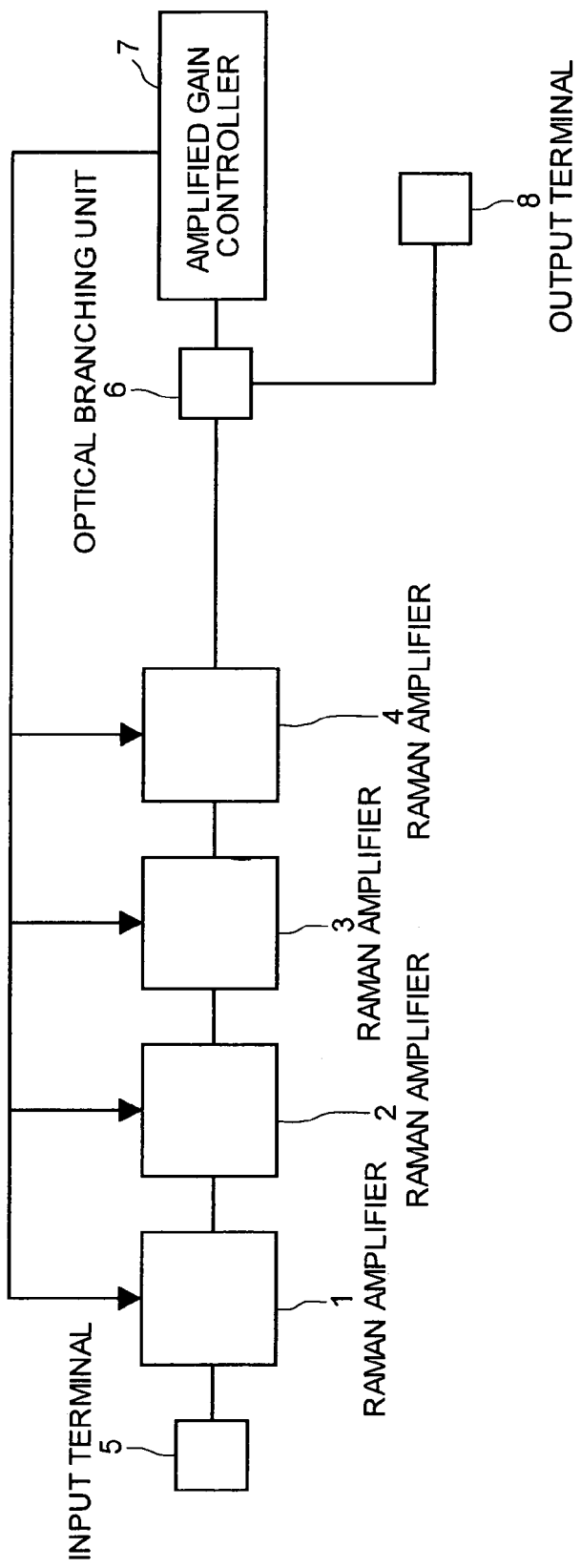
FIG. 1 is a block diagram of a Raman amplifying device according to a first embodiment of the present invention.

Exemplary embodiments of a Raman amplifying device and a Raman amplifying system according to the present invention will be explained below with reference to the accompanying drawings. In the drawings, like or similar elements are designated with like reference signs. It should be noted that the drawings are only schematic, and are different from the actual products. Furthermore, it is a matter of course that in respective drawings, parts may have a different relation and ratio in size.

A Raman amplifying device according to a first embodiment of the present invention will be explained first. FIG. 1 is a block diagram of the entire structure of the Raman amplifying device. The structure of the Raman amplifying device according to the first embodiment will be explained below.

The Raman amplifying device according to the first embodiment has Raman amplifiers 1 to 4 sequentially connected to an input terminal an optical branching unit 6 connected to the Raman amplifier 4, an amplification gain controller 7 connected to one of output terminals of the optical branching unit 6, and an output terminal 8 formed of the other of the output terminals of the optical branching unit 6.

Figure 2:
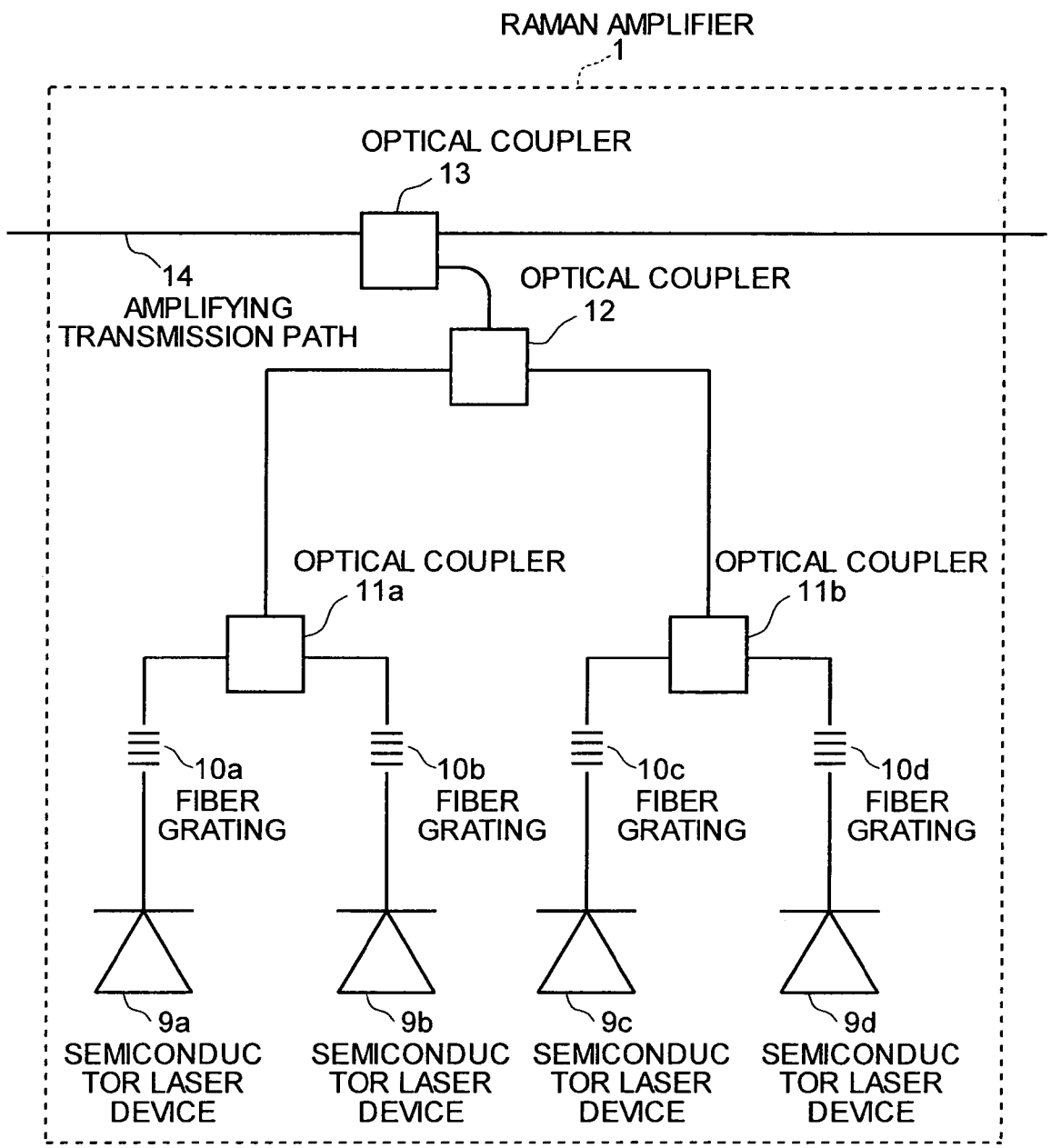
FIG. 2 is a block diagram of the structure of a Raman amplifier constituting the Raman amplifying device according to the first embodiment.

FIG. 2 is a diagram of the structure of the Raman amplifier 1. The Raman amplifier 1 has semiconductor laser devices 9a to 9d that function as a pump light source, fiber gratings 10a to 10d respectively provided corresponding to the semiconductor laser devices 9a to 9d, an optical coupler 11a that couples laser light output from the semiconductor laser devices 9a and 9b, and an optical coupler 11b that couples laser light output from the semiconductor laser devices 9c and 9d. The Raman amplifier 1 further has an optical coupler 12 that further couples the laser light output from the optical couplers 11a and 11b to form a pump light, and the formed pump light has a structure to be input to an amplifying transmission line 14 via the optical coupler 13. As shown in FIG. 2, the Raman amplifier 1 uses a backward pumping method in which the traveling direction of the pump light in an amplifying transmission line 14 is opposite to the traveling direction of the Raman-amplified light, but a forward pumping method or a bidirectional pumping method can be used.

The semiconductor laser devices 9a and 9b have a structure of emitting laser light having substantially the same peak wavelength defined respectively by the fiber gratings 10a and 10b. The semiconductor laser devices 9c and 9d emit laser light having substantially the same peak wavelength defined respectively by the fiber gratings 10c and 10d, and the wavelength interval between the peak wavelengths of the semiconductor laser devices 9a and 9b and the peak wavelength of the semiconductor laser devices 9c and 9d is at least 6 nanometers. A thermostatic module (not shown) is respectively added to the semiconductor laser devices 9a to 9d and the fiber gratings 10a to 10d so as to have a structure capable of changing the temperature thereof.

The semiconductor laser devices 9a and 9b and the optical coupler 11a are connected by a polarization-preserving fiber, and the laser light output from the semiconductor laser devices 9a and 9b are coupled by the optical coupler 11a so as to be orthogonal to each other. It is because Raman amplification has polarization dependency, and it is desired to perform Raman amplification after the pump light is depolarized, in order to stabilize the amplification gain. The semiconductor laser devices 9c and 9d and the optical coupler 11b are also connected by a polarization-preserving fiber due to the same reason, and coupled so that the polarization direction of the laser light is orthogonal to each other.

Figure 3:
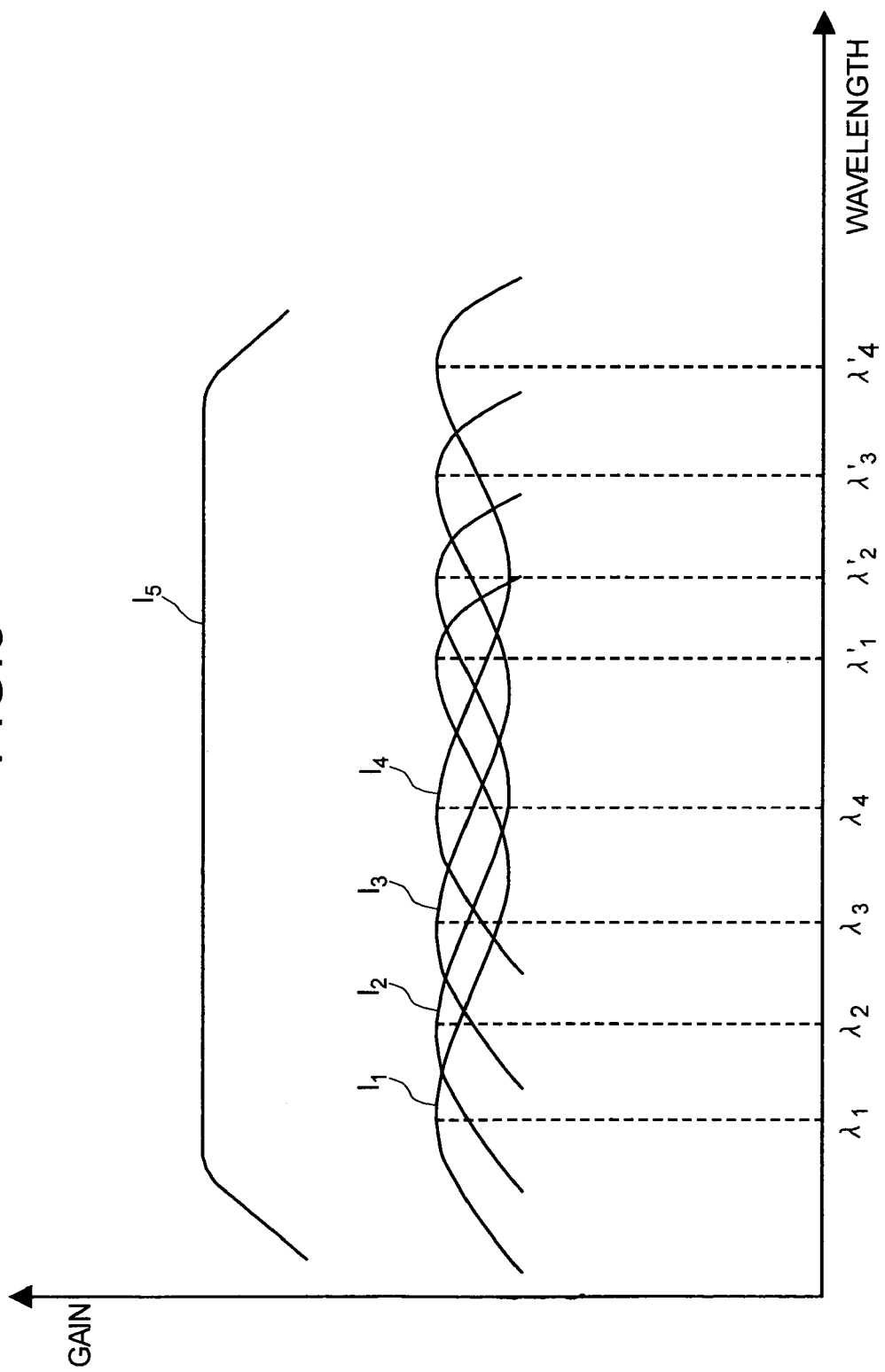
FIG. 3 is a graph of a gain wavelength characteristic of the Raman amplifying device according to the first embodiment.

The Raman amplifiers 2 to 4 have basically the same structure as that of the Raman amplifier 1 shown in FIG. 2, but the semiconductor laser devices and the fiber gratings are formed such that the central wavelength at the gain peak has a different value, respectively. FIG. 3 is a graph of the gain wavelength characteristic of the Raman amplifying device according to the first embodiment, formed by combining the gain wavelength characteristics of the Raman amplifiers 1 to 4. A curve $I_1$ indicates a gain wavelength characteristic of the Raman amplifier 1, curves $I_2$, $I_3$, and $I_4$ sequentially indicate gain wavelength characteristics of the Raman amplifiers 2, 3, and 4. A curve $I_5$ obtained by combining the curves $I_1$ to $I_4$ indicate the gain wavelength characteristic of the Raman amplifying device according to the first embodiment.

As shown in FIG. 3, the gain peaks obtained from the Raman amplifiers 1 to 4 are different from each other, and the central wavelengths $\lambda_1$, $\lambda_2$, $\lambda_3$, and $\lambda_4$ at the respective gain peaks respectively form an arithmetic sequence. In the first embodiment, it is assumed that a tolerance of the arithmetic sequence formed by the wavelengths corresponding to the respective gain peaks is a value obtained by dividing a difference between the wavelengths $\lambda_1$ and $\lambda_1'$ of two gain peaks obtained from the Raman amplifier 1 by the number of Raman amplifiers. Likewise, it is assumed that the wavelengths $\lambda_1'$, $\lambda_2'$, $\lambda_3'$, and $\lambda_4'$ of other gain peaks obtained from the Raman amplifiers 1 to 4 respectively form an arithmetic sequence, and a tolerance of the arithmetic sequence is a value obtained by dividing a difference between the wavelengths $\lambda_1$ and $\lambda_1'$ by the number of Raman amplifiers. In the first embodiment, the number of gain peaks obtained by the Raman amplifier 1 is set to two, but if there are three or more gain peaks of the Raman amplifier 1, it is desired that a mean value of the wavelength intervals between the adjacent gain peaks is used as the tolerance.

Regarding the gain wavelength characteristics obtained from the Raman amplifiers 1 to 4, since the wavelength of the gain peaks obtained from the respective Raman amplifiers 1 to 4 is different, it is prevented that the gain deviation is accumulated, as compared with an instance in which a plurality of Raman amplifiers having the same gain wavelength characteristic is included. Particularly, the interval between the respective gain peaks becomes equal by setting the gain wavelength characteristics of the Raman amplifiers 1 to 4 such that the respective gain peak wavelengths form an arithmetic sequence. As a result, as indicated by the curve $I_5$, the Raman amplifying device according to the first embodiment has a flat gain wavelength characteristic. Furthermore, since the Raman amplifying device has a configuration of obtaining the gain by the Raman amplifiers, there is no limitation in the wavelength interval between the adjacent gain peaks, and the wavelength interval can be reduced to 6 nanometers or less, thereby increasing the flatness. The wavelength interval is preferably 6 nanometers or less, and more preferably, 0.3 nanometers or less.

Figure 4:
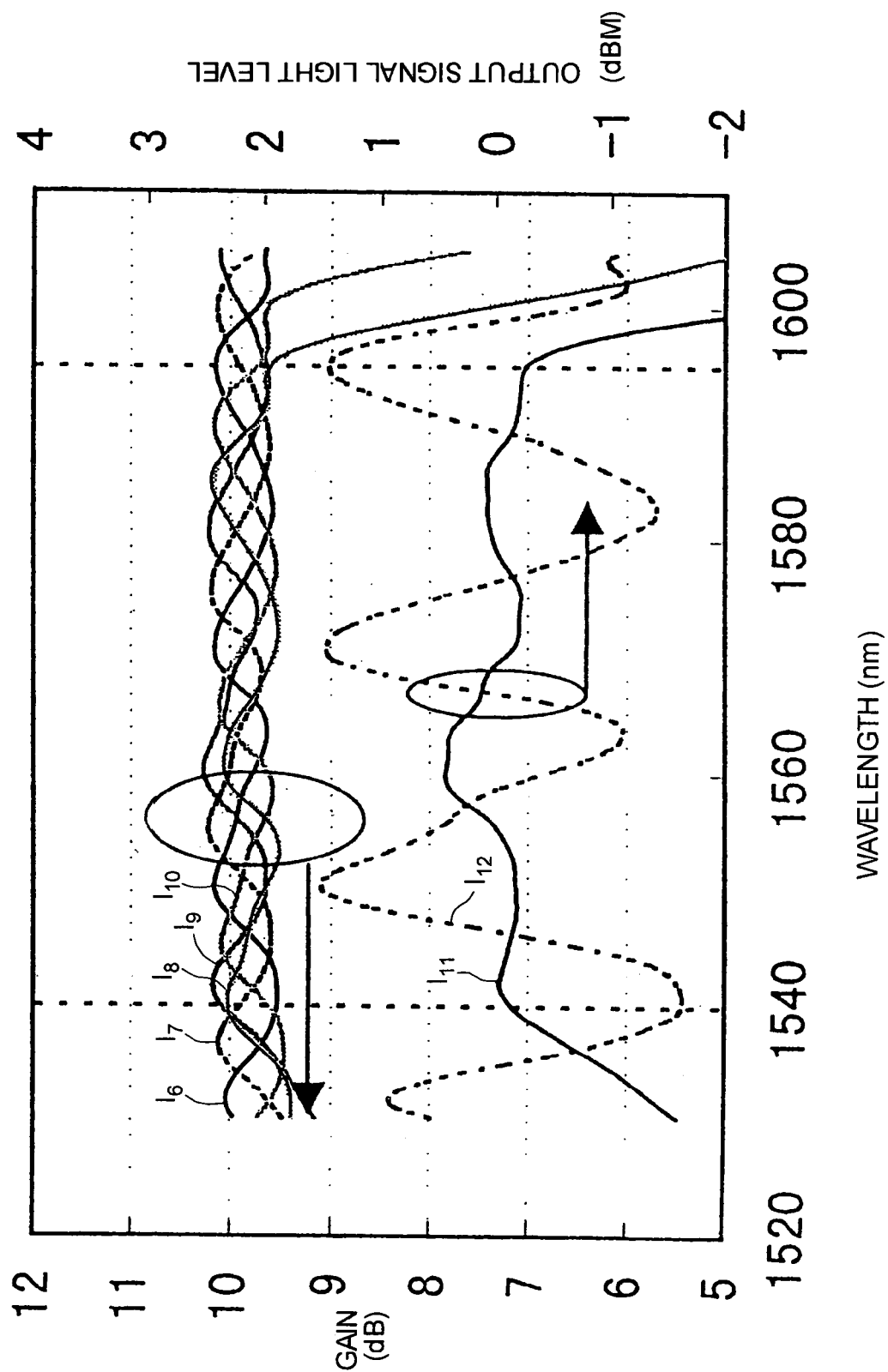
FIG. 4 is a graph in which a wavelength intensity characteristic of an amplified light obtained by the Raman amplifying device according to the first embodiment is compared with the wavelength intensity characteristic of an amplifier obtained by a conventional Raman amplifier.

FIG. 4 is a graph in which a gain wavelength characteristic obtained by combining the Raman amplifiers having the same characteristic as in the conventional example, and the gain wavelength characteristic of the Raman amplifying device according to the first embodiment are compared with each other. As shown in FIG. 4, the Raman amplifying device according to the first embodiment includes Raman amplifiers having the gain wavelength characteristics denoted by curves $I_6$ to $I_{10}$, respectively, and as a result of amplifying the light by the Raman amplifying device having the gain wavelength characteristic obtained by combining the respective gain wavelength characteristics, the wavelength intensity characteristic of the amplified light becomes as indicated by a curve $I_{11}$.

On the other hand, for example, when five Raman amplifiers having the gain wavelength characteristic as indicated by the curve $I_6$ are simply combined as in the conventional example, the wavelength intensity characteristic of the amplified light becomes as indicated by a curve $I_{12}$. When the wavelength range of the signal light to be amplified is from 1540 to 1595 nanometers, as is obvious from the comparison of the curves $I_{11}$ and $I_{12}$, a deviation of the amplification gain in such a wavelength range is largely different. Specifically, the intensity deviation of the light amplified by the Raman amplifying device according to the first embodiment is 0.9 decibel, while the intensity deviation becomes equal to more than 3 decibels in the conventional example.

The amplification gain controller 7 will be explained next. FIG. 5 is a block diagram of the structure of the amplification gain controller 7. The amplification gain controller 7 has, as shown in FIG. 5, an optical branching filter 15 that braches the Raman-amplified light, and photoelectric transducers 16a to 16h that convert the respective branched light to an electric signal. The photoelectric transducers 16a to 16f are connected to a control wavelength detector 18. The control wavelength detector 18 is connected to a storage unit 17 to detect abnormal wavelength components in the amplified light by comparing information stored in the storage unit 17 and the input electric signal. A controller 19 is connected to the control wavelength detector 18, the storage unit 17, and the Raman amplifiers 1 to 4.

The optical branching filter 15 is used for branching the input light to light in a predetermined wavelength range, to output the light. Specifically, the optical branching filter 15 is formed of a melt-type coupler or the like, formed by melting and combining a plurality of optical fibers.

The photoelectric transducers 16a to 16h are used for converting the input light to an electric signal corresponding to the intensity. Specifically, the photoelectric transducers 16a to 16h are formed of a photodiode, a photoresistor, and the like.

The storage unit 17 is for storing information necessary for controlling the gain wavelength characteristic. Specifically, the storage unit 17 stores information relating to the intensity tolerance of the respective wavelength components of the light branched by the optical branching filter 15, information relating to the wavelength of the gain peak corresponding to the wavelength components of the light input to the amplification gain controller 7, and information for specifying the Raman amplifier that supplies such a gain peak.

The control wavelength detector 18 is for specifying the Raman amplifier to be controlled. Specifically, the control wavelength detector 18 has functions of comparing the intensity of the branched light with the intensity tolerance of the light stored in the storage unit 17, detecting the wavelength of the wavelength component of the light having the intensity outside the tolerance, detecting a predetermined gain peak based on the wavelength, and selecting the Raman amplifier for supplying the detected gain peak.

The controller 19 is for controlling the control wavelength detector 18, the storage unit 17, and the Raman amplifiers 1 to 4. Specifically, the controller 19 controls the operation of the control wavelength detector 18 and the storage unit 17, and also has a function of controlling the semiconductor laser device that outputs a peak having a wavelength the same as or near the peak wavelength, based on the peak wavelength of the pump light detected by the control wavelength detector 18. As for the control contents, the temperature of the attached thermostatic module is changed to change the wavelength or the intensity of the pump light, with respect to at least one of the semiconductor laser device and the fiber grating constituting the Raman amplifiers 1 to 4. Furthermore, the current value injected into the semiconductor laser device is changed, according to need, thereby changing the intensity of the pump light.

As the specific mode of control by the controller 19, for example, the controller 19 emits a control signal and transmits the control signal to the Raman amplifiers 1 to 4 via an input terminal 5 by using a directional coupler or the like. Moreover, for example, the control signal may be transmitted through a down link, not through an up link in which the Raman amplifiers 1 to 4 are arranged, or a line dedicated for control can be included. Furthermore, the control can be performed not by the optical signal but by an electric signal or the like.

The operation of the amplification gain controller 7 will be explained next. FIG. 6 is a graph of a state in which the flat gain wavelength characteristic is disturbed due to some cause, and FIG. 7 is a flowchart of the operation of the amplification gain controller 7. As shown in FIG. 6, since the gain wavelength characteristic (curve $I_1$') obtained by the Raman amplifier 1 is shifted toward lower intensity as a whole, the flatness is also disturbed with respect to the gain wavelength characteristic of the entire Raman amplifying device indicated by a curve $I_5$'. The operation of the amplification gain controller 7 will be explained with reference to the flowchart in FIG. 7, for an example in which the gain wavelength characteristic is as shown in FIG. 6. The input light has a flat intensity wavelength characteristic in a predetermined wavelength range. As a result, the light amplified by the Raman amplifiers 1 to 4 has the intensity wavelength characteristic same as the gain wavelength characteristic shown in FIG. 6.

The presence of the wavelength component outside the tolerance, of the light amplified by the Raman amplifiers 1 to 4, is detected, and the wavelength is detected when the wavelength component is present (step S101). Specifically, the amplified light is branched for each predetermined wavelength range by the optical branching filter 15 and input to the control wavelength detector 18 after having been converted to an electric signal by the photoelectric transducers 16a to 16h. The control wavelength detector 18 compares the electric signal corresponding to the respective wavelength components of the amplified light with the tolerance stored in the storage unit 17, to detect the wavelength component outside the tolerance. At this step, when the wavelength component outside the tolerance is not present, the operation of the amplification gain controller 7 is finished at this point in time.

The Raman amplifier having a predetermined gain peak is selected based on the wavelength detected at step S101 (step S102). Specifically, since the peak wavelength of the pump light corresponding to the wavelength of the amplified light is stored in the storage unit 17, the gain peak the same as or near the wavelength of the detected wavelength component is detected and the Raman amplifier that supplies such a gain peak is selected. In the example shown in FIG. 6, since $\lambda_2$ approaches $\lambda_5$, and $\lambda_2$' approaches $\lambda_6$, the Raman amplifier 2 having the gain peak of wavelengths $\lambda_2$ and $\lambda_2$' is selected.

The control signal is then transmitted to the selected Raman amplifier, to change the gain wavelength characteristic of the Raman amplifier (step S103). Specifically, the Raman amplifier having received the control signal changes the temperature of the fiber gratings or the semiconductor laser devices included therein and the current value injected into the semiconductor laser devices as required, according to the content of the control signal. By changing the temperature or the like, at least one of the wavelengths and the intensity of the gain peak in the selected Raman amplifier are changed. In the example shown in FIG. 6, a control signal is provided to the Raman amplifier 2 that outputs the pump light of a wavelength corresponding to the gain peak wavelength $\lambda_2$ and $\lambda_2$', and the wavelength of the two gain peaks of the Raman amplifier 2 is shifted to the short wavelength side by $\Delta\lambda$. As shown in FIG. 8, the gain peak wavelength is also changed to $\lambda_2$-$\Delta\lambda$ and $\lambda_2$'-$\Delta\lambda$, and the entire curve $I_2$ is shifted to the short wavelength side, to change to a curve $I_2$'.

Presence of the wavelength component outside the tolerance is detected with respect to the light amplified based on the changed gain wavelength characteristic (step S104). Specifically, the presence of the wavelength component outside the tolerance is checked by the same method as at step S101, and when the wavelength component outside the tolerance is present, control returns to step S102. When control returns to step S102, a Raman amplifier different from the selected Raman amplifier is selected to change the gain wavelength characteristic again at step S103. When the wavelength component outside the tolerance is not present, since it is no more necessary to perform the control, the operation of the amplification gain controller 7 is finished. In the example shown in FIG. 6, as shown in FIG. 8, since the gain wavelength characteristic of the entire Raman amplifying device is flattened, the operation of the amplification gain controller 7 is finished.

The Raman amplifying device according to the first embodiment has advantages described below. At first, since the amplification gain controller 7 is provided, there is an advantage in that fluctuations in the gain wavelength characteristic due to environmental conditions of a place where the Raman amplifying device is installed can be reduced. As described above, in the optical communication system performing long distance transmission, the Raman gain coefficient in the amplifying transmission path in which Raman amplification is performed or the attenuation constant of the pump light output from the semiconductor laser devices may change, due to fluctuations in the temperature or the like in the external environment. Therefore, when the Raman amplifying device is actually installed, the gain wavelength characteristic can be different from the gain wavelength characteristic at the time of production, depending on the environmental conditions. In the first embodiment, since the amplification gain controller 7 is provided, the gain wavelength characteristic of the entire Raman amplifying device can be adjusted, and hence, a Raman amplifying device that does not depend on the change in the environmental conditions can be realized.

There is another advantage in that fluctuations in the gain wavelength characteristic due to a malfunction can be reduced. As shown in the example in FIG. 6, the gain wavelength characteristic of the entire Raman amplifying device may change due to a malfunction in the Raman amplifier 1 constituting the Raman amplifying device. However, the fluctuations in the gain wavelength characteristic of the entire Raman amplifying device can be dissolved or improved to some extent by changing the gain wavelength characteristic of the Raman amplifier 2 by the amplification gain controller 7. Replacement of the failed part may be difficult according to the place where the Raman amplifying device is arranged. Therefore, it is a great advantage that the gain wavelength characteristic can be maintained at a certain level until the part is replaced.

When the Raman amplifying device according to the first embodiment is used in the optical communication system or the like, there is an advantage in that deterioration of a signal light source can be dealt with. In the first embodiment, the amplification gain controller 7 has a configuration of directly detecting the wavelength intensity characteristic of the Raman-amplified light (the signal light in the optical communication system), to control the gain wavelength characteristics of the Raman amplifiers 1 to 4. Therefore, for example, even when the intensity wavelength characteristic of the signal light input to the Raman amplifying device loses the flatness due to deterioration in the signal light source, though the Raman amplifiers 1 to 4 realize desired gain wavelength characteristics, the amplification gain controller 7 controls the Raman amplifiers 1 to 4 so that the amplified light output from the Raman amplifying device has a flat wavelength intensity characteristic. Therefore, fluctuations in the wavelength intensity characteristic due to deterioration in the signal light source can be dissolved or improved to some extent.

The Raman amplifying device according to the first embodiment has another advantage in that when a trouble occurs in any of the Raman amplifiers 1 to 4, the failed Raman amplifier can be determined quickly. Since the control wavelength detector 18 determines the Raman amplifier having a predetermined gain peak based on the information stored in the storage unit 17, the failed Raman amplifier can be quickly determined. Particularly, in the first embodiment, since the Raman amplifiers 1 to 4 have gain peaks of a different wavelength, the Raman amplifier is in one-to-one correspondence with the wavelength having the intensity outside the tolerance in the amplified light. As a result, the failed Raman amplifier can be easily determined.

The Raman amplifying device according to the first embodiment has a structure formed by Raman amplifiers having different adjacent gain peaks, the gain wavelength characteristic can be easily flattened. As described above, in the Raman amplifying device according to the first embodiment, since the adjacent gain peaks are formed by different Raman amplifiers, the wavelength interval between the adjacent gain peaks can be made equal to or smaller than 6 nanometers. Therefore, for example, the wavelength interval between the adjacent gain peaks can be made the same level as the wavelength variable amount of the gain peaks by the respective semiconductor laser devices or the fiber gratings, thereby enlarging the wavelength variable range by the amplification gain controller 7 and flattening the gain wavelength characteristic very easily. For example, when the temperature of the fiber gratings is controlled to control the peak wavelength of the pump light, it is desired to set the wavelength interval between the adjacent gain peaks to 0.3 nanometers or less. Since the wavelength range that can be changed by the fiber grating is about 0.3 nanometers, such a wavelength interval can make the control easy.

According to the Raman amplifying device of the first embodiment, there is an advantage in that the control algorithm for the gain wavelength characteristic can be simplified. The Raman amplifiers according to the first embodiment are arranged such that the wavelengths of the gain peaks form an arithmetic sequence. Therefore, even when there is a wavelength component outside the tolerance in the amplified light, the same algorithm can be used regardless of the wavelength of such a wavelength component. In other words, since the wavelength interval between the gain peaks is constant, formulation is possible as to how much it is necessary to change the wavelengths of the adjacent gain peaks with respect to the amount deviated from the tolerance.

In the explanation of the first embodiment, the number of the Raman amplifiers included in the Raman amplifying device is four, but the number of the Raman amplifiers is not limited to four, and the Raman amplifying device according to the first embodiment can be formed by an optional number of Raman amplifiers.

The structure of the Raman amplifiers 1 to 4 is not limited to the one described above. With reference to FIG. 2, the semiconductor laser devices 9a to 9d attached with the fiber gratings 10a to 10d can output laser light of different wavelengths, if these have a wavelength difference of 6 nanometers or more from each other. In the first embodiment, for example, a pair of the semiconductor laser devices 9a and 9b is coupled so that the polarization direction thereof is orthogonal to each other. However, a depolarizer can be arranged between the fiber gratings 10a to 10d and the optical couplers 11a and 11b, to directly depolarize the laser light output from the semiconductor laser devices 9a to 9d. In this case, since more gain peaks can be realized by fewer semiconductor laser devices, a Raman amplifier having a wider gain band can be realized. Not only by such a structure but also by the system design, a desired pump light can be realized by combining optional couplers for an optional wavelength configuration.

The semiconductor laser devices forming the Raman amplifiers 1 to 4 can have a configuration of outputting laser light having a plurality of peaks from a single semiconductor laser device, other than the one that outputs the laser light having a single peak. Furthermore, the structure in which the peak wavelength is defined by the fiber grating may not be used, but a diffraction grating can be provided in the semiconductor laser device, like a distributed feedback (DFB) laser or a distributed Bragg reflector (DBR) laser. In this case, the fiber gratings can be omitted.

To change the peak wavelength of the pump light in the Raman amplifiers 1 to 4, it is desired to change the current value injected into the semiconductor laser device. It is because by changing the injected current, the refractive index inside the semiconductor laser device also changes to change the wavelength of the output laser light. Specifically, it is desired that a variable optical attenuator (VOA) be attached to the semiconductor laser device, to change the peak wavelength of the pump light by changing the injected current, and intensity fluctuations of the pump light due to the change in the injected current value be suppressed by the VOA. By adopting such a structure, the peak wavelength of the pump light in the Raman amplifiers 1 to 4 can be controlled by the injected current value. When such a wavelength control is to be performed, there is an advantage in that the fiber gratings can be omitted.

Furthermore, it is desired to change the peak wavelength of the pump light by controlling the temperature of the semiconductor laser devices, as well as to control a change in the peak intensity of the pump light due to a temperature change by controlling the injected current. Also in this case, since the peak wavelength of the pump light can be controlled directly with respect to the semiconductor laser devices, the fiber gratings can be omitted.

The sequence of the gain peaks forming the arithmetic sequence can be determined regardless of the sequence for actually arranging the Raman amplifiers. For example, for the sequence of the Raman amplifiers, these can be arranged in order of the Raman amplifier 1, the Raman amplifier 3, the Raman amplifier 4, and the Raman amplifier 2.

As for the control by the controller 19, not only the Raman amplifier having, one gain peak closest to the wavelength component deviated from the tolerance is controlled in the wavelength intensity characteristic of the amplified light, but other Raman amplifiers can be controlled together. Specifically, for example, all gain peaks in a certain wavelength interval range can be controlled with respect to the wavelength component deviated from the tolerance, or other methods can be used.

Furthermore, the number of the semiconductor laser devices and the fiber gratings constituting the Raman amplifiers 1 to 4, and the number of the photoelectric transducers 16a to 16h in the amplification gain controller 7 are not limited to those described above, and an optional number can be used.

In the Raman amplifying device according to the first embodiment, the gain wavelength characteristic thereof is not limited to the flat gain wavelength characteristic. In the above explanation, the flat gain wavelength characteristic is ideal, but a gain wavelength characteristic for compensating for a loss wavelength characteristic of the entire optical communication system or a gain wavelength characteristic for compensating for the intensity wavelength characteristic of the light output from the signal light source can be used. Furthermore, any one of a gain wavelength characteristic required as the entire system and a gain wavelength characteristic satisfying the NF system requirement or both can be used.

An example by numerical simulation will be explained. In the numerical simulation, the gain peak of the individual Raman amplifier is actually specified, to perform control by the amplification gain controller 7. In this example, it is assumed that the number of Raman amplifiers is 5 (Raman amplifiers A to E), and the number of gain peaks is 4.

FIG. 9A depicts wavelengths $\lambda_{p1}$ to $\lambda_{p4}$ of the gain peaks of the respective Raman amplifiers before the control by the amplification gain controller 7, and FIG. 9B depicts the intensity of the respective gain peaks of the respective Raman amplifiers. For example, in the Raman amplifier A before the control by the amplification gain controller 7, the wavelength of the gain peak in the wavelength $\lambda_{p1}$ is 1424.192 nanometers, and the peak intensity is 186 milliwatts. The wavelength of the wavelength $\lambda_{p4}$ in the Raman amplifier B is 1493.143 nanometers, and the peak intensity is 179 milliwatts. For the amplifying transmission path, a single mode fiber (SMF) having a length of 50 kilometers is used. In this example, for the brevity of explanation, the intensity of the gain peak is not particularly changed, and the gain wavelength characteristic of the Raman amplifying device is controlled by controlling the wavelength of the gain peak.

In the case of the gain wavelength characteristics shown in FIGS. 9A and 9B, the intensity wavelength characteristic of the amplified light becomes such that a difference between the maximum value and the minimum value of the intensity is 0.75 decibel. In contrast, the tolerance is set so that a difference between the maximum value and the minimum value of the intensity becomes equal to or less than 0.70 decibel.

The wavelength of the gain peak of the respective Raman amplifiers is changed as shown in FIG. 10, by a virtual control by the amplification gain controller 7 (in practice, a simulation). Specifically, the wavelength of the second gain peak of the Raman amplifier B is changed from 1444.234 nanometers to 1444.034 nanometers, and the wavelengths of the second gain peak and the third gain peak of the Raman amplifier C are changed, respectively, from 1448.544 nanometers to 1448.744 nanometers, and from 1466.045 nanometers to 1465.845 nanometers. The wavelengths of the second gain peak and the fourth gain peak of the Raman amplifier D are also changed, respectively, from 1435.616 nanometers to 1435.816 nanometers, and from 1484.525 nanometers to 1484.725 nanometers. Furthermore, the wavelengths of the first, the third, and the fourth gain peaks of the Raman amplifier E are changed, respectively, from 1415.573 nanometers to 1415.373 nanometers, from 1448.807 nanometers to 1449.007 nanometers, and from 1480.215 nanometers to 1480.415 nanometers.

Thus, by changing the wavelength of the respective gain peaks, the difference between the maximum value and the minimum value in the intensity wavelength characteristic of the light amplified by the Raman amplifiers A to E is changed to 0.69 decibel. The difference can be reduced up to 0.69 decibel by setting the tolerance such that the difference between the maximum value and the minimum value becomes equal to or less than 0.70 decibel.

A Raman amplifying device according to a second embodiment of the present invention will be explained. The Raman amplifying device includes a Raman amplifier having a predetermined gain characteristic, and a Raman amplifier whose predetermined amplification gain characteristic is shifted by a shift amount determined based on the sum approximation of periodic functions of such a gain characteristic, with respect to the gain characteristic of the Raman amplifier, thereby realizing flattening of the gain characteristic as a whole. According to the second embodiment, the specific configuration of the Raman amplifying device is the same as that of the first embodiment, and the Raman amplifying device according to the second embodiment has a configuration shown in FIGS. 1, 2, and 5. Derivation of the shift amount by the sum approximation of periodic functions, which is the different point from the first embodiment, will be explained first, and a specific example will be explained thereafter.

The wavelength of the gain characteristic of the Raman amplifier can be approximated by the sum of the periodic functions, as in the case of general functions. When the distribution of periodic functions constituting the approximation formula of the gain characteristic wavelength is taken into consideration, in the case of the gain characteristic having excellent flatness, the approximation formula is formed by periodic functions having a long period or having an infinite period, or by various periodic functions having substantially the same amplitude, to compensate for the influence thereof, and a flat wavelength is realized as a whole. On the other hand, in the case of the gain characteristic having poor flatness, there is a periodic function having larger amplitude as compared to others, among the periodic functions constituting the approximation formula. In other words, it can be considered that the flatness of the gain characteristic is disturbed due to the presence of the periodic function having larger amplitude as compared to others.

Based on the consideration above, in the second embodiment, the shift amount is determined by using the result of sum approximation of periodic functions of the gain characteristic formed by one or more Raman amplifiers as a reference. In other words, the shift amount of the gain characteristic is determined based on the period of a periodic function selected from the periodic functions used for the sum approximation of periodic functions, for example, based on the period of a periodic function having the largest amplitude, so that the influence of such a periodic function is reduced. A Raman amplifying device having a flat gain characteristic is realized as a whole, by newly adding a Raman amplifier having a gain characteristic shifted by the determined shift amount with respect to the gain characteristic of the Raman amplifier as the reference.

An example in which Fourier transformation is used as one method of the sum approximation of periodic functions for the gain characteristic will be explained. As one example of the gain characteristic for which the sum approximation of periodic functions is carried out, an example in which the frequency-dependent gain frequency characteristic of the amplification gain is used will be explained. However, frequency-dependent gain wavelength characteristic of the amplification gain can be used as the gain characteristic to be used for the sum approximation of periodic functions.

Figure 11A:
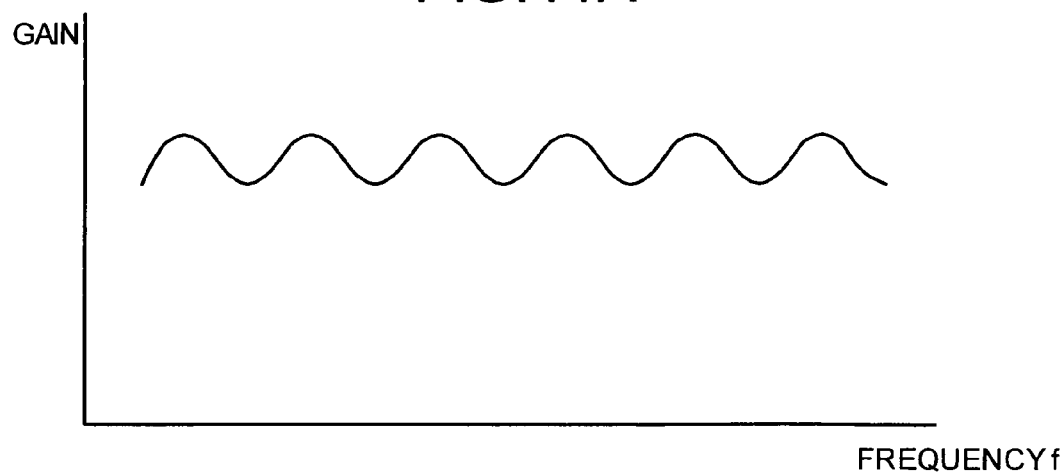
FIGS. 11A to 11C is a diagram for explaining a derivation mechanism of a shift amount of a gain characteristic in a Raman amplifying device according to a second embodiment of the present invention.

For simplicity, a Raman amplifying device shown in FIG. 11A, which includes a Raman amplifier having an optional gain frequency characteristic $G(f)$, and a Raman amplifier having a gain frequency characteristic $G(f-f_0)$ shifted by a frequency $f_0$ with respect to the gain frequency characteristic $G(f)$, will be taken into consideration. The gain frequency characteristic as the entire Raman amplifying device is given by $G(f)+G(f-f_0)$, and the frequency $f_0$ is determined hereunder so that $G(f)+G(f-f_0)$ becomes a flat function with respect to a frequency change.

Generally, when it is assumed that a function mapped in an X space by performing Fourier transformation with respect to the gain frequency characteristic $G(f)$ by a kernel $\exp(-i2\pi fX)$ is $F(X)$, the gain frequency characteristic $G(f)$ and $F(X)$ have the following relationship $$F(X) = \int_{-\infty}^{\infty} G(f)e^{-i2\pi fX} df \qquad (1)$$

A variable X used for the Fourier transformation in equation (1) is a variable that means a reciprocal of a period of the approximated periodic function. The gain frequency characteristic $G(f-f_0)$ and $F(X)$ have the following relationship $$\int_{-\infty}^{\infty} G(f-f_0)e^{-i2\pi fX} df = \qquad (2)$$
$$e^{-i2\pi f_0 X}\int_{-\infty}^{\infty} G(f)e^{-i2\pi fX} df = e^{-i2\pi f_0 X}F(X)$$

From equations (1) and (2), Fourier transform mapping of the gain frequency characteristic of the Raman amplifying device including the Raman amplifier having the gain frequency characteristic $G(f)$, and the Raman amplifier having the gain frequency characteristic $G(f-f_0)$ becomes $\{1+\exp(-i2\pi f_0 X)\}F(X)$. A power spectrum of such mapping is expressed as $$|1+e^{-i2\pi f_0 X}|^2|F(X)|^2 = 4\cos^2(\theta X)|F(X)|^2 \qquad (4)$$

by using $$\theta = \pi f_0 \qquad (3)$$

In the Raman amplifying device according to the second embodiment, by adjusting the gain characteristic of the Raman amplifier, which is a constituent, so that the peak value of the power spectrum expressed by equation (4) is decreased, a Raman amplifying device having a flat gain frequency characteristic is realized.

Figure 11B:
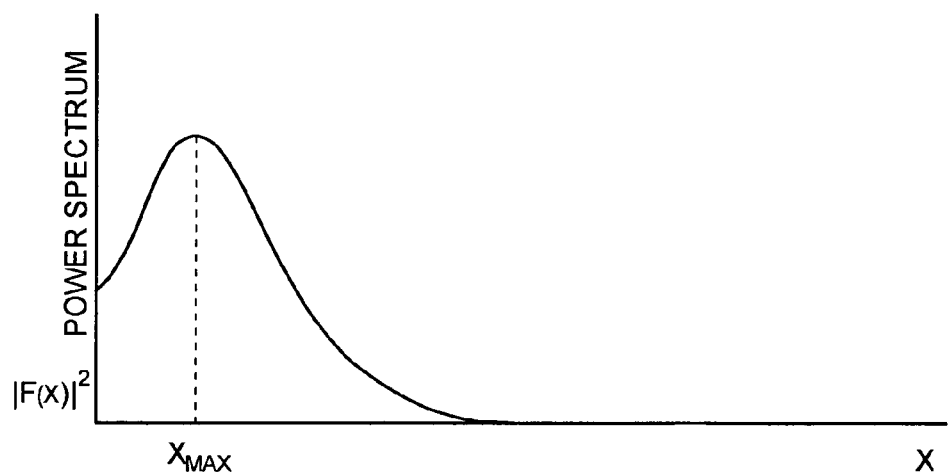
Figure 11C:
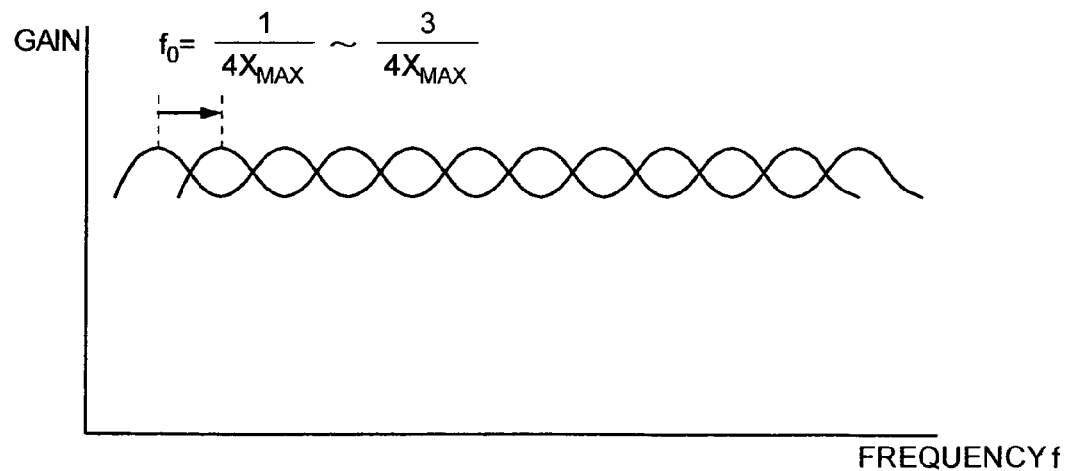

Specifically, as shown in FIG. 11B, since X giving a peak value is present with regard to $|F(X)|^2$ obtained from $G(f)$, at first, a value $X_{MAX}$ of X giving the maximum value of $|F(X)|^2$ is derived. It is assumed here that $X_{MAX}$ is selected from $X \neq 0$. That is, from equation (3), since $\cos(\theta X)$ is a function of $f_0$, by appropriately selecting the value of $f_0$, the value $\cos^2(\theta X)$ in equation (4) decreases, thereby decreasing the peak value of the power spectrum in $X=X_{MAX}$. Specifically, as shown in FIG. 11C, the value of shift amount $f_0$ is selected in a range of from $1/(4X_{MAX})$ to $3/(4X_{MAX})$ inclusive. More preferably, the value $f_0$ is determined so that the value of equation (4) in $X=X_{MAX}$ becomes the smallest. Specifically, the peak value of the power spectrum can be decreased by setting the value of $f_0$ to $1/(2X_{MAX})$. By decreasing the peak value of the power spectrum, the flatness of the entire power spectrum can be improved, thereby improving the flatness of the gain frequency characteristic of the Raman amplifying device.

With regard to derivation of the shift amount of the gain characteristic of the Raman amplifier constituting the Raman amplifying device according to the second embodiment, Fourier transformation expressed by equation (1) can be substituted by discrete Fourier transformation using a computer. In the discrete Fourier transformation, the frequency f is handled as N discrete values such as $f_1$, $f_1+h$, $f_1+2h$, ..., $f_1+(n-1)h$, ..., $f_1+(N-1)h(=f_2)$, in the gain frequency characteristic $G(f)$ of the Raman amplifier A, and the following calculation is performed with regard to the gain frequency characteristic $G_n$ corresponding to the respective frequencies $$F(X, f_2-f_1) = h\sum_{N=0}^{N-1} G_n \exp(-i2\pi X(f_1+nh)) \qquad (5)$$

Accompanying discretization of the frequency f and the gain frequency characteristic Gn, the variable X is also discretized and is expressed as $X=X_k=kX_0=k/Nh$ (k=0, 1, ..., N−1).

In the discrete Fourier transformation, a Fourier component $F_k$ is defined as a value corresponding to F(X) obtained by the Fourier transformation in equation (1). Specifically, the Fourier component $F_k$ is expressed as $$F_k = F(X_k, f_2-f_1)/h \qquad (6)$$

The square of an absolute value of the Fourier component $F_k$ corresponds to the power spectrum $|F(X)|^2$ in the Fourier transformation in equation (1). Therefore, when the discrete Fourier transformation is used, the discrete Fourier transformation shown in equation (5) can be performed with respect to the gain frequency characteristic Gn of the Raman amplifier A, to derive k, by which the square of the absolute value of the Fourier component shown in equation (6) becomes the maximum. Based on the value of $X_k$ corresponding to k, the Raman amplifier B has a gain frequency characteristic in which the frequency is shifted with respect to the gain frequency characteristic Gn by $1/(4X_k)$ or more, and $3/(4X_k)$ or less, more preferably, by $1/(2X_k)$, thereby realizing the Raman amplifying device having a flat gain frequency characteristic.

Example 1, which is a specific example of the theory explained in the second embodiment, will be explained. The Raman amplifying device according to the Example 1 has a configuration in which a Raman amplifier having a gain characteristic shown in FIG. 12 (In FIG. 12, the wavelength is plotted on the X axis) is combined with another Raman amplifier having a gain characteristic shifted with respect to the gain characteristic by a shift amount obtained by Fourier transform mapping.

Figure 12:
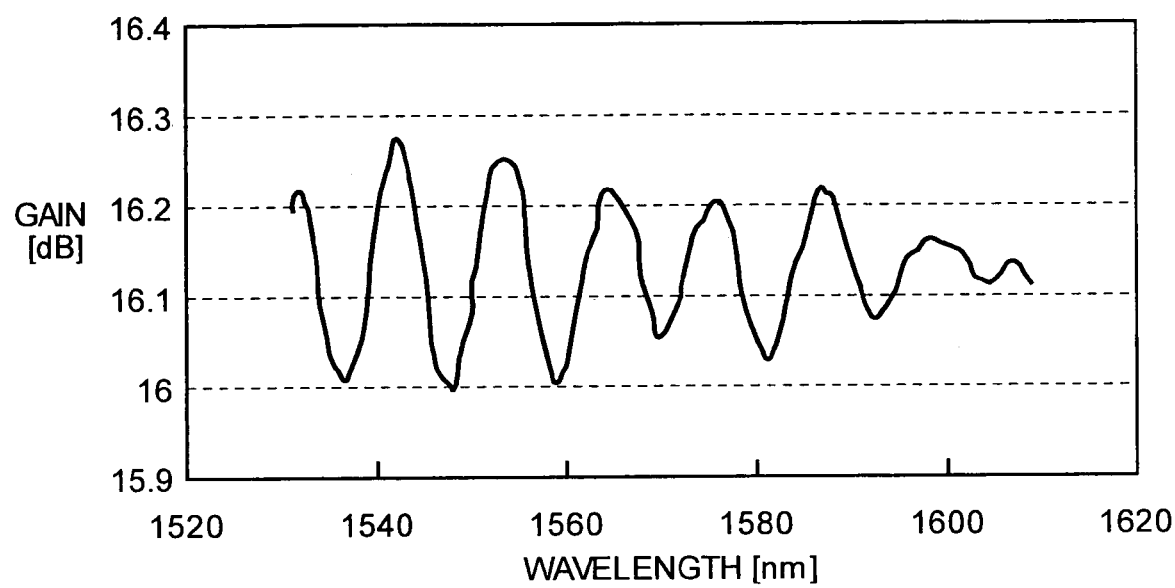
FIG. 12 is a graph of the gain characteristic of a Raman amplifier A in Example 1 in the second embodiment.

The Raman amplifier having the gain characteristic shown in FIG. 12 (hereinafter, "Raman amplifier A") has an amplification characteristic in which the wavelength band of a signal light to be amplified is from 1530 to 1610 nanometers, a channel interval, which is a frequency interval between signal lights having the closest frequencies, is 100 gigahertz, and the number of channels is 96. As a specific configuration, a dispersion-shifted fiber (DSF) having a fiber length of 80 kilometers is used as a Raman amplification medium, and a pump light emitted from eight semiconductor laser devices is introduced to the Raman amplification medium according to the backward pumping method. The gain characteristic of the Raman amplifier A shown in FIG. 12 is such that a gain mean value is 16.131 decibels, and a difference between the maximum value and the minimum value of the gain is 0.279 decibel. The relation between the wavelength (unit: nanometer) of the pump light and the intensity (unit: milliwatt) of the pump light in the Raman amplifier A is shown in Table 1.

Derivation of the shift amount of the gain characteristic of the Raman amplifier (hereinafter, "Raman amplifier B") that flattens the gain characteristic of the entire Raman amplifying device by being combined with the Raman amplifier A having such a gain characteristic will be explained below. At first, the gain frequency characteristic of the Raman amplifier A is Fourier-transformed in the X space, to derive a power spectrum, which is the square of the absolute value of $F(X_k)$ obtained by Fourier transformation. The Fourier transformation in the Example 1 uses the discrete Fourier transformation.

Figure 13:
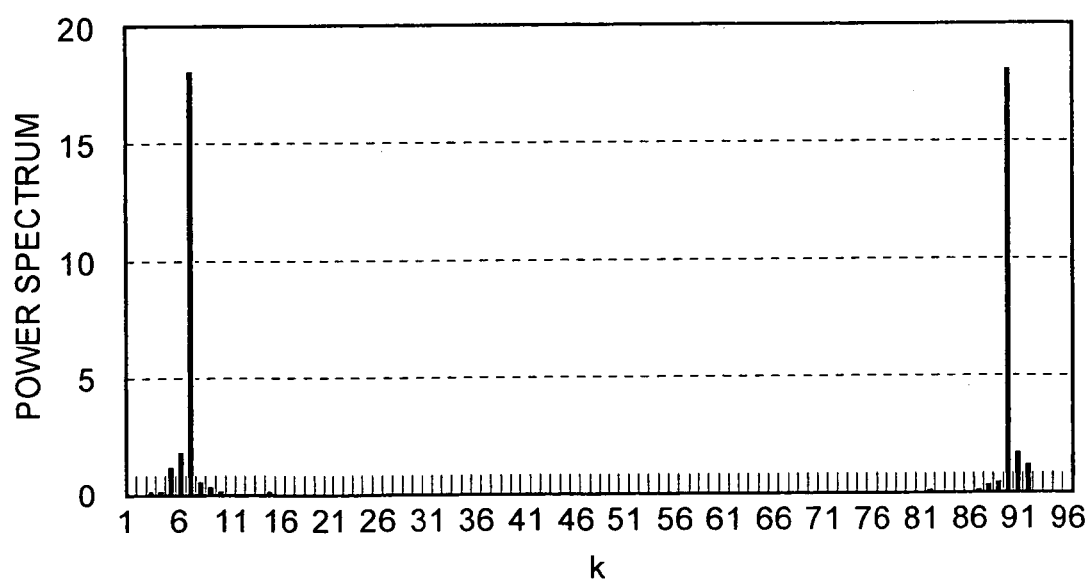
FIG. 13 is a graph of a result of Fourier transformation of the gain characteristic of the Raman amplifier A.

FIG. 13 is a graph of the $X_k$ dependency of the power spectrum derived by the discrete Fourier transformation. In FIG. 13, the X-axis denotes a value of k in $X_k=k/Nh$. In the discrete Fourier transformation performed in the Example 1, the frequency band (f2−f1) is 9.6 terahertz, and a sampling cycle h is 0.1 terahertz. Therefore, the number of sampling is N=9.6/0.1=96, and if the value on the X-axis in FIG. 13 is divided by 9.6, $X_k(THz)^{-1}$ can be obtained. The power spectrum in the case of k being equal to N/2 or larger, that is, in this example, $k \geq 49$ can be ignored, according to the sampling theorem.

In other words, according to the Example 1, k needs only to be derived, by which the power spectrum $|F_k|^2$ becomes the largest in the range of $0 \leq k \leq 48$. It is obvious that the k value is 7 from the graph shown in FIG. 13, and hence, the value of $X_k$, at which the power spectrum $|F_k|^2$ becomes the largest is 7/(96×0.1), from $X_k=k/Nh$, N=96, and h=0.1.

To flatten the gain frequency characteristic as the entire Raman amplifying device, the gain frequency characteristic of the Raman amplifier B needs only to be shifted with respect to the gain frequency characteristic of the Raman amplifier A by $1/(4X_k)$ or more, and $3/(4X_k)$ or less, more preferably, by $1/(2X_k)$. Therefore, in the case of the Example 1, the gain frequency characteristic of the Raman amplifier B is shifted with respect to the gain frequency characteristic of the Raman amplifier A by a quantity of from 0.345 to 1.035 teraheltz, and more preferably, by 0.69 teraheltz.

When the frequency shift amount is 0.69 teraheltz, one example of the relation between the wavelength (unit: nanometer) of the pump light and the intensity (unit: milliwatt) of the pump light in the Raman amplifier B is as shown in Table 2.

TABLE 1

| Wavelength of pump light | 1422.84 | 1433.04 | 1442.00 | 1451.78 | 1461.69 | 1471.01 | 1480.46 | 1503.47 |
|---|---|---|---|---|---|---|---|---|
| Intensity of pump light | 244.02 | 188.21 | 114.10 | 91.88 | 53.43 | 50.36 | 29.19 | 61.42 |

TABLE 2

| Wavelength of Pump light | 1427.49 | 1437.76 | 1446.78 | 1456.62 | 1466.59 | 1475.98 | 1485.49 | 1508.66 |
|---|---|---|---|---|---|---|---|---|
| Power of pump light | 233.67 | 174.96 | 110.18 | 88.85 | 52.24 | 48.29 | 29.70 | 60.91 |

Figure 14:
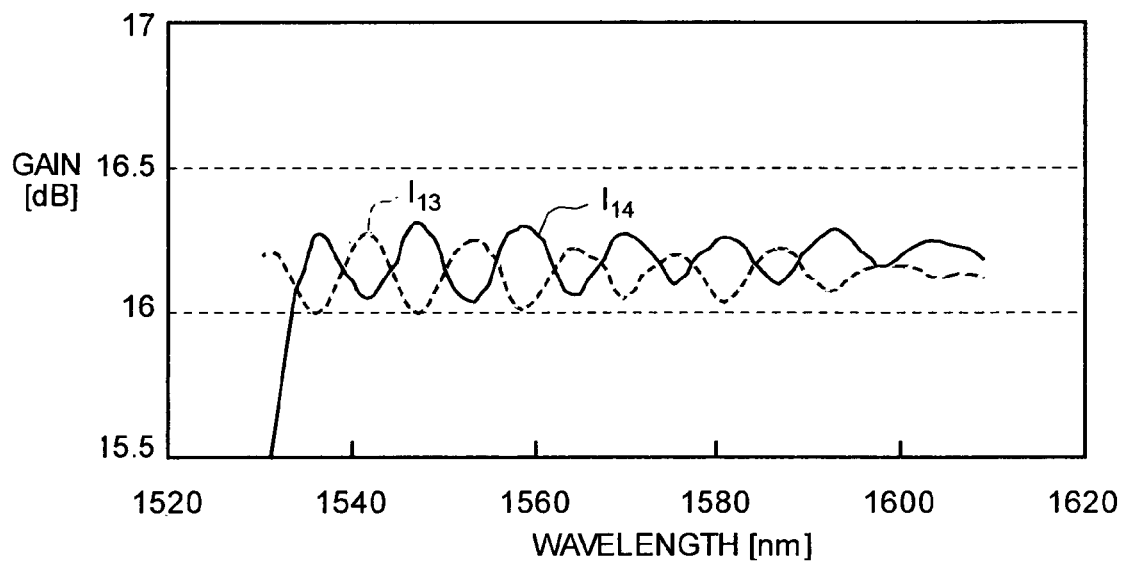
FIG. 14 is a graph of the gain characteristics of Raman amplifiers A and B.

FIG. 14 is a graph of the gain characteristic of the Raman amplifier A and the gain characteristic of the Raman amplifier B, when the frequency shift amount relating to the gain frequency characteristic of the Raman amplifier B is 0.69 teraheltz. In FIG. 14, wavelength is plotted on the X-axis in the gain characteristic. In FIG. 14, a curve $I_{13}$ indicates the gain characteristic of the Raman amplifier A, and a curve $I_{14}$ indicates the gain characteristic of the Raman amplifier B. The direction of shifting the frequency can be either a high frequency direction or a low frequency direction, but in the Example 1, the gain characteristic of the Raman amplifier B is shifted with respect to the gain characteristic of the Raman amplifier A to the long wavelength side (low frequency side), as shown in FIG. 14.

As shown in FIG. 14, the gain characteristic of the Raman amplifier B is formed such that a valley is formed in the peak in the gain characteristic of the Raman amplifier A, and a peak is formed in the valley in the gain characteristic of the Raman amplifier A. Therefore, it is obvious that the gain characteristic of the Raman amplifier B functions so as to flatten the undulations in the gain characteristic of the Raman amplifier A.

Figure 15:
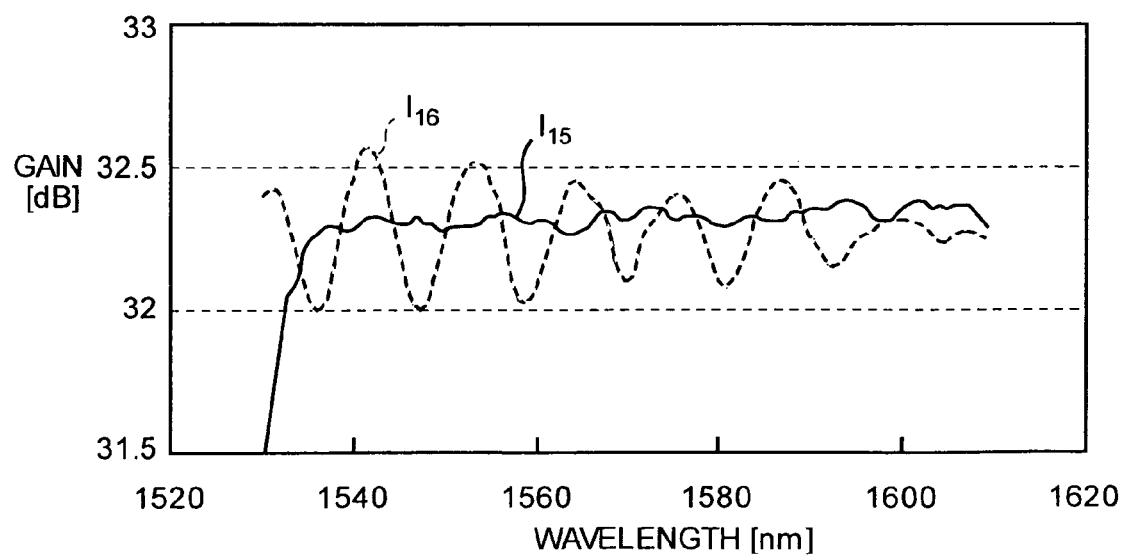
FIG. 15 is a graph of the gain characteristic of the entire Raman amplifying device according to the Example 1.

FIG. 15 is a graph of the gain characteristic of the entire Raman amplifying device according to the Example 1, combining the gain characteristic of the Raman amplifier A and the gain characteristic of the Raman amplifier B. In FIG. 15, a curve $I_{15}$ indicates the gain characteristic of the entire Raman amplifying device according to the Example 1 in which the Raman amplifier A and the Raman amplifier B are combined, and a curve $I_{16}$ indicates the gain characteristic of a Raman amplifying device in which two Raman amplifiers A are serially connected for the comparison.

As shown in FIG. 15, the Raman amplifying device according to the Example 1 can realize a gain characteristic having excellent flatness, as compared to the configuration in which two Raman amplifier A are connected. Specifically, a difference between the maximum value and the minimum value of the gain in the use band when the two Raman amplifiers A are connected is 0.558 decibel, while the Raman amplifying device according to the Example 1 can decrease the difference between the maximum value and the minimum value of the gain up to 0.111 decibel.

A Raman amplifying device according to an Example 2 of the second embodiment will be explained. The Raman amplifying device according to the Example 2 is formed of four Raman amplifiers, wherein after approximation by the sum of periodic functions is performed with respect to the gain characteristic realized by the existing two Raman amplifiers, the shift amount of the Raman amplifier having the similar pattern to that of the existing Raman amplifiers is determined.

According to the Example 2, the Raman amplifier A and the Raman amplifier B explained in the Example 1 are used as the existing two Raman amplifiers. Based on the sum approximation of periodic functions of the gain characteristic of the existing Raman amplifiers, the shift quantities relating to the gain characteristic of newly added Raman amplifier C and Raman amplifier D are determined. According to the Example 2, the configuration of the used Raman amplifier is the same as in the Example 1, and even in the discrete Fourier transformation, the frequency band ($f_2-f1$), the sampling cycle h, and the number N of sampling are the same as in Example 1, and the power spectrum of $k \geq 49$ can be similarly ignored based on the sampling theorem. Derivation of the shift amount relating to the gain characteristic of the Raman amplifier C and the Raman amplifier D will be specifically explained below.

Figure 16:
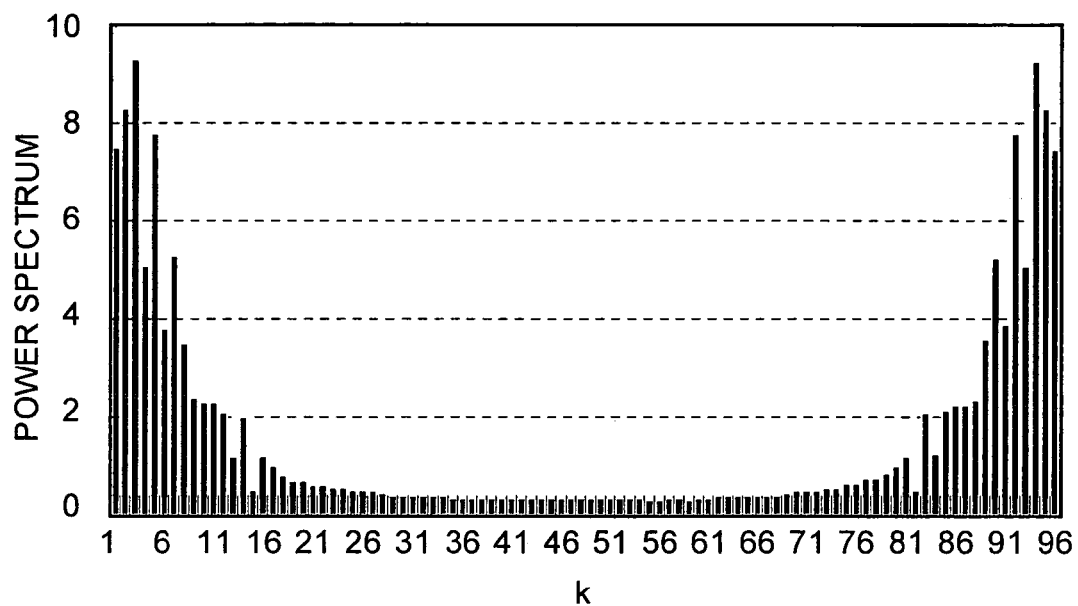
FIG. 16 is a graph of a result of Fourier transformation of the gain characteristics of the Raman amplifiers A and B in a Raman amplifying device according to the Example 2.

At first, discrete Fourier transformation is performed with respect to the gain frequency characteristic formed by the sum of the gain frequency characteristic of the Raman amplifier A and the gain frequency characteristic of the Raman amplifier B. FIG. 16 is a graph of the results of discrete Fourier transformation performed with respect to the gain frequency characteristic formed by the sum of the gain frequency characteristic of the Raman amplifier A and the gain frequency characteristic of the Raman amplifier B. In FIG. 16, the X-axis denotes a value of k forming $X_k$, as in FIG. 13, and the Y-axis denotes the intensity of the power spectrum. In FIG. 16, the power spectrum in $k \geq 49$ is ignored based on the sampling theorem as in FIG. 13.

As shown in FIG. 16, since the value of k giving the largest power spectrum is 3, from $X_k=k/Nh$, N=96, and h=0.1 in the Example 2, the value of $X_k$ at which the power spectrum becomes the largest is 3/(96×0.1). Therefore, in order to flatten the gain frequency characteristic of the Raman amplifying device according to the Example 2 formed of the Raman amplifiers A to D, the gain frequency characteristics of the Raman amplifiers C and D need only to be shifted from the gain frequency characteristics of the Raman amplifiers A and B by a range of from 0.8 to 2.4 teraheltz, and more preferably, by 1.6 teraheltz.

According to the Example 2, the relation between the wavelength (unit: nanometer) and the intensity (unit: milliwatt) of the pump light in the Raman amplifiers C and D, when the gain frequency characteristics of the Raman amplifiers C and D are shifted from the gain frequency characteristics of the Raman amplifiers A and B toward the high frequency side (short wavelength side) by 1.6 teraheltz, is shown in Tables 3 and 4, respectively.

TABLE 3

| Wavelength of Pump light | 1433.72 | 1444.09 | 1453.19 | 1463.12 | 1473.18 | 1482.65 | 1492.25 | 1515.63 |
|---|---|---|---|---|---|---|---|---|
| Power of pump light | 219.53 | 165.08 | 102.68 | 85.63 | 48.29 | 33.85 | 48.72 | 50.82 |

TABLE 4

| Wavelength of Pump light | 1438.45 | 1448.87 | 1458.04 | 1468.03 | 1478.16 | 1487.70 | 1497.36 | 1520.91 |
|---|---|---|---|---|---|---|---|---|
| Power of pump light | 210.98 | 160.49 | 101.53 | 83.09 | 44.14 | 48.32 | 33.15 | 55.48 |

Figure 17:
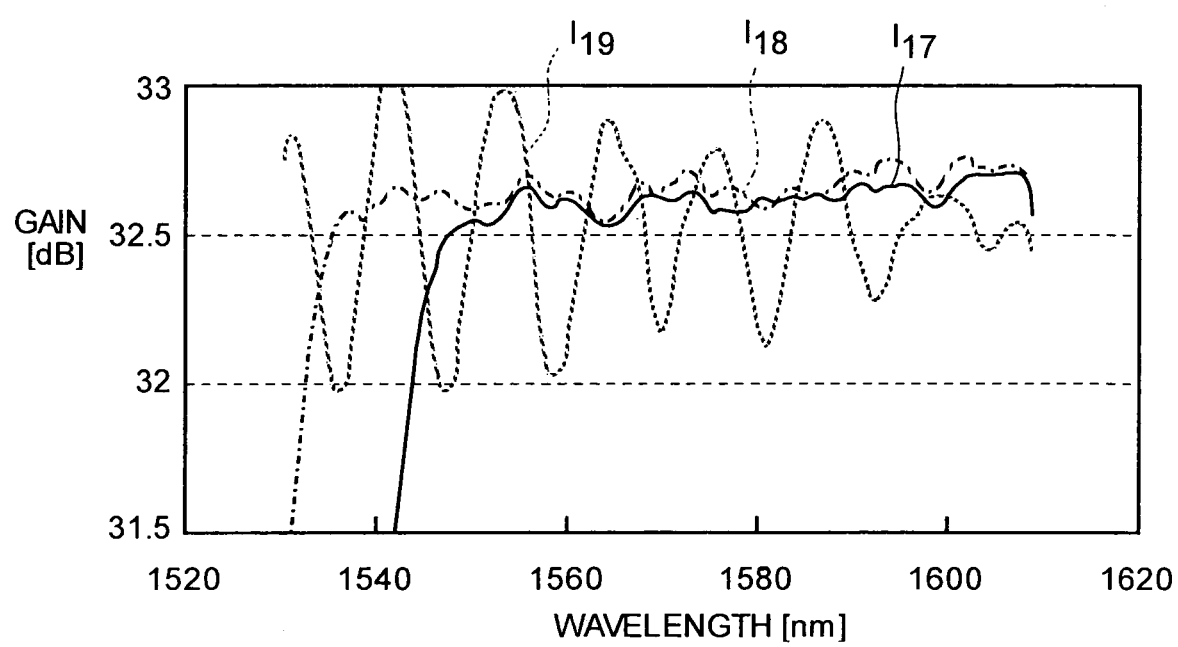
FIG. 17 is a graph of the gain characteristic of the entire Raman amplifying device according to Example 2.

The gain characteristic of the Raman amplifying device as a whole in second embodiment obtained by newly combining the Raman amplifiers C and D having the wavelength of a pump light and the intensity of a pump light as shown in Tables 3 and 4 will be explained. FIG. 17 is a graph of the gain characteristic of the Raman amplifying device as a whole in the Example 2. In FIG. 17, a curve $I_{17}$ indicates the gain characteristic of the Raman amplifying device according to the Example 2, and a curve $I_{18}$ indicates the gain characteristic of a Raman amplifying device in which two Raman amplifying devices according to the Example 1 are serially connected, that is, two Raman amplifiers A and two Raman amplifiers B are connected. Furthermore, a curve $I_{19}$ indicates the gain characteristic in a configuration in which four Raman amplifiers A are serially connected.

As shown in FIG. 17, the Raman amplifying device according to the Example 2 can realize a flatter gain characteristic, as compared with a configuration in which four Raman amplifiers A are serially connected, or a configuration in which two Raman amplifying devices according to the Example 1 are serially connected. Specifically, when four Raman amplifiers A are serially connected, the difference between the maximum value and the minimum value of the gain in the use band is 1.116 decibels, and the difference between the maximum value and the minimum value of the gain when the two Raman amplifying devices in Example 1 are connected is 0.222 decibel. In contrast, in the case of the Raman amplifying device according to the Example 2, the difference between the maximum value and the minimum value of the gain in the use band is 0.180 decibel, and as a result, it is obvious that the flatness of the gain is further improved.

As described in the Example 2, the Raman amplifier that realizes the gain characteristic as a reference can be provided in a plurality of numbers, and the Raman amplifier that realizes the gain characteristic shifted with respect to the reference gain characteristic by a predetermined quantity can be provided in a plurality of numbers. Furthermore, according to the Example 2, after the shift amount is derived, the gain characteristic of the Raman amplifier C is shifted based on the gain characteristic of the Raman amplifier A, and the gain characteristic of the Raman amplifier D is shifted based on the gain characteristic of the Raman amplifier B. This means that the gain characteristic obtained by shifting the gain characteristics obtained by the Raman amplifiers A and B by a predetermined quantity is realized by the Raman amplifiers C and D.

According to the second embodiment and Examples 1 and 2 thereof, an example in which the gain frequency characteristic is used as an example of the gain characteristic, and sum approximation of periodic functions is performed by the Fourier transformation relating to the frequency has been explained. However, not only the gain frequency characteristic is used, but also the gain wavelength characteristic can be used as another example of the gain characteristic, to perform the sum approximation of periodic functions by the Fourier transformation relating to the wavelength.

For example, when a certain Raman amplifier has a gain wavelength characteristic $G(\lambda)$, it can be expressed as $$F(Y) = \int_{-\infty}^{\infty} G(\lambda) e^{-i\lambda Y} d\lambda \quad (1)'$$

by designating the frequency f as $\lambda$, $2\pi X$ as Y, and df as $d\lambda$ in equation (1). Furthermore, the Fourier transformation relating to the Raman amplifier having a gain wavelength characteristic $G(\lambda-\lambda_0)$ is given as $$\int_{-\infty}^{\infty} G(\lambda-\lambda_0) e^{-i\lambda Y} d\lambda = e^{-i\lambda_0 Y} \int_{-\infty}^{\infty} G(\lambda) e^{-i\lambda Y} df = e^{-i\lambda_0 Y} F(Y) \quad (2)'$$

as in equation (2). Therefore, the Fourier transform mapping of $G(\lambda)+G(\lambda-\lambda_0)$ is given by $(1+e^{-\lambda_0 Y})F(Y)$, and thereafter, $Y_{MAX}$ can be derived by using the same method as in the instance in which the shift amount is determined based on the gain frequency characteristic, to determine a wavelength shift amount $\lambda_0$. Furthermore, at the time of performing. Fourier transformation relating to the wavelength, discrete Fourier transformation can be used.

According to the second embodiment and Examples 1 and 2, a periodic function having the largest power spectrum is selected from the periodic functions obtained by the sum approximation of periodic functions, to derive the shift amount based on the period of the selected periodic function. However, it is not necessary to interpret the present invention by limiting the selection condition of the periodic function thereto, but selection of the periodic function can be selected based on various selection conditions.

Figure 18:
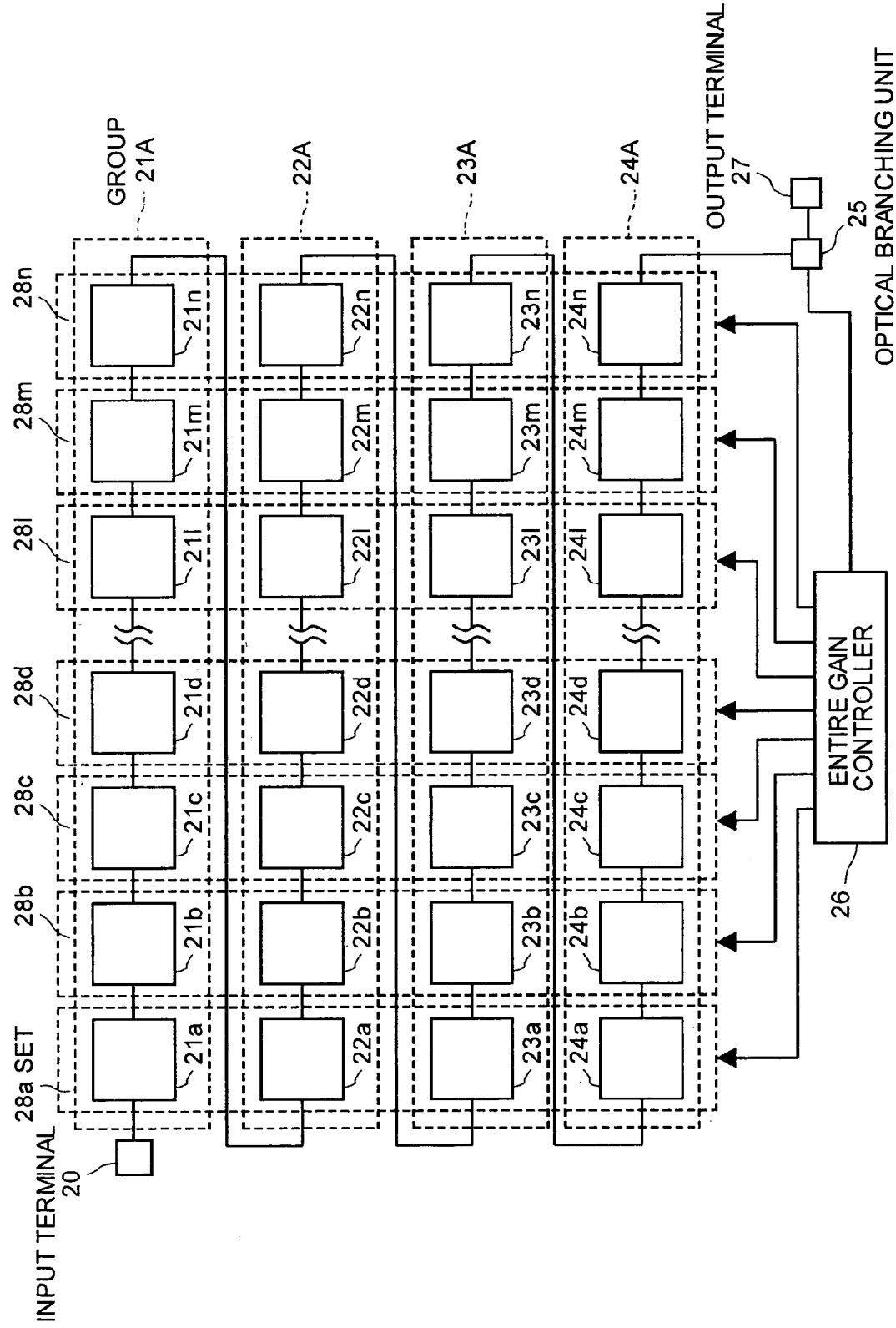
FIG. 18 is a block diagram of the structure of a Raman amplifying system according to a third embodiment of the present invention.

A Raman amplifying system according to a third embodiment of the present invention will be explained. The Raman amplifying system according to the third embodiment has a configuration in which a plurality of groups of Raman amplifiers in the first or the second embodiment is arranged, and a single entire gain controller controls the gain wavelength characteristics of those Raman amplifiers. FIG. 18 is a block diagram of the configuration of the Raman amplifying system according to the third embodiment, and the Raman amplifying system will be explained with reference to FIG. 18.

The Raman amplifying system according to the third embodiment includes a group 21A in which Raman amplifiers 21a to 21n are sequentially connected, a group 22A in which Raman amplifiers 22a to 22n are sequentially connected, group 23A in which Raman amplifiers 23a to 23n are sequentially connected, and group 24A in which Raman amplifiers 24a to 24n are sequentially connected. The groups 21A to 24A are sequentially connected to an input terminal 20, an optical branching unit 25 is connected to the group 24A, an entire gain controller 26 is connected to one of the output terminals of the optical branching unit 25, and an amplified light is output from the other output terminal 27 of the optical branching unit 25.

The Raman amplifiers 21a to 21n have respectively different gain wavelength characteristics, as in the Raman amplifiers 1 to 4 in the first or the second embodiment, and have a gain peak of a wavelength different from each other. Therefore, a gain deviation can be prevented from being accumulated, as compared with an instance in which Raman amplifiers having the same gain wavelength characteristic are provided. The wavelengths of the gain peak obtained from the Raman amplifiers 21a to 21n form an arithmetic sequence, and since the wavelength interval between the respective gain peaks becomes the same, the gain wavelength characteristic of the whole group 21A is flattened. The adjacent gain peaks are obtained from different Raman amplifiers. Therefore, though the wavelength interval between the gain peaks in the respective Raman amplifiers 21a to 21n is equal to or larger than 6 nanometers, the wavelength interval between gain peaks as the whole group 21A can be made equal to or smaller than 6 nanometers, thereby realizing improved flatness. The Raman amplifiers 21a to 21n respectively have the same structure as shown in FIG. 2, and the number of the gain peaks can be two or more. It is desired that the tolerance of the arithmetic sequence is a mean value of the wavelength intervals between the adjacent gain peaks in an optional Raman amplifier forming the group.

The Raman amplifiers 21a, 22a, 23a, and 24a of the Raman amplifiers belonging to different groups have substantially the same gain wavelength characteristic and a gain peak of substantially the same wavelength. Likewise, Raman amplifiers 21b to 24b, and Raman amplifiers 21c to 24c have substantially the same gain wavelength characteristic and a gain peak of substantially the same wavelength. Therefore, the groups 22A to 24A have the same gain wavelength characteristic as that of the group 21A, and have a flat gain wavelength characteristic as in the group 21A.

Thus, since there are Raman amplifiers belonging to different groups and having the same gain wavelength characteristic, a set is set up for each of Raman amplifiers having the same gain wavelength characteristic. That is, Raman amplifiers 21a to 24a are designated as a set 28a, Raman amplifiers 21b to 24b are designated as a set 28b, and so forth, to set up sets 28a to 28n.

Figure 19:
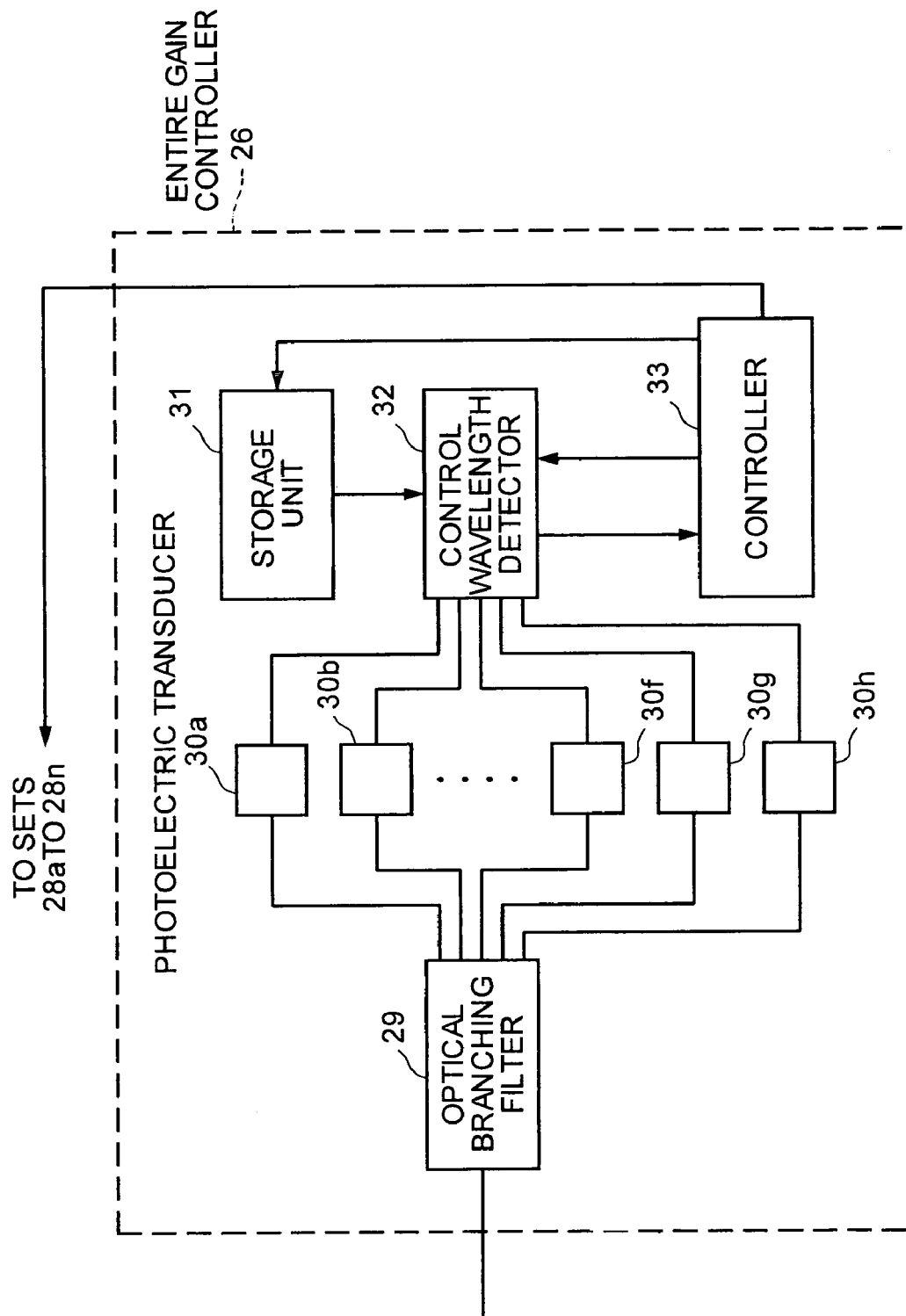
FIG. 19 is a block diagram of the structure of an entire gain controller in the Raman amplifying system according to the third embodiment.

The structure of the entire gain controller 26 will be explained with reference to FIG. 19. FIG. 19 is a block diagram of the structure of the entire gain controller 26. The entire gain controller 26 includes an optical branching filter 29 that branches the light input from the optical branching unit 25 for each wavelength, photoelectric transducers 30a. to 30h that convert the branched light to an electric signal, a storage unit 31 that stores necessary information, a control wavelength detector 32 connected to the photoelectric transducers 30a to 30h and the storage unit 31, and a controller 33 that controls the storage unit 31, the control wavelength detector 32, and the sets 28a to 28n.

The optical branching filter 29 is formed of a melt-type coupler in which a plurality of optical fibers is melt-coupled, an array waveguide, a diffraction grating and the like, for branching the input light for each predetermined wavelength range. The photoelectric transducers 30a. to 30h are formed of a photodiode or the like.

The storage unit 31 stores information relating to the intensity tolerance of a light branched by the optical branching filter 29, the wavelength of the gain peak corresponding to the wavelength component of the branched light, and by which sets 28a to 28n such a wavelength of the gain peak is supplied. The control wavelength detector 32 has a function of inputting an electric signal corresponding to the branched wavelength component, and detecting a set corresponding to a wavelength component deviated from the tolerance by appropriately referring to the information stored in the storage unit 31, to output the set to the controller 33.

The controller 33 is for controlling the storage unit 31, the control wavelength detector 32, and the sets 28a to 28n. Specifically, the controller 33 has a function of controlling the operation of the storage unit 31 and the control wavelength detector 32, and controlling the gain wavelength characteristic of the Raman amplifiers belonging to the sets 28a to 28n, based on the information output from the control wavelength detector 32.

Figure 20:
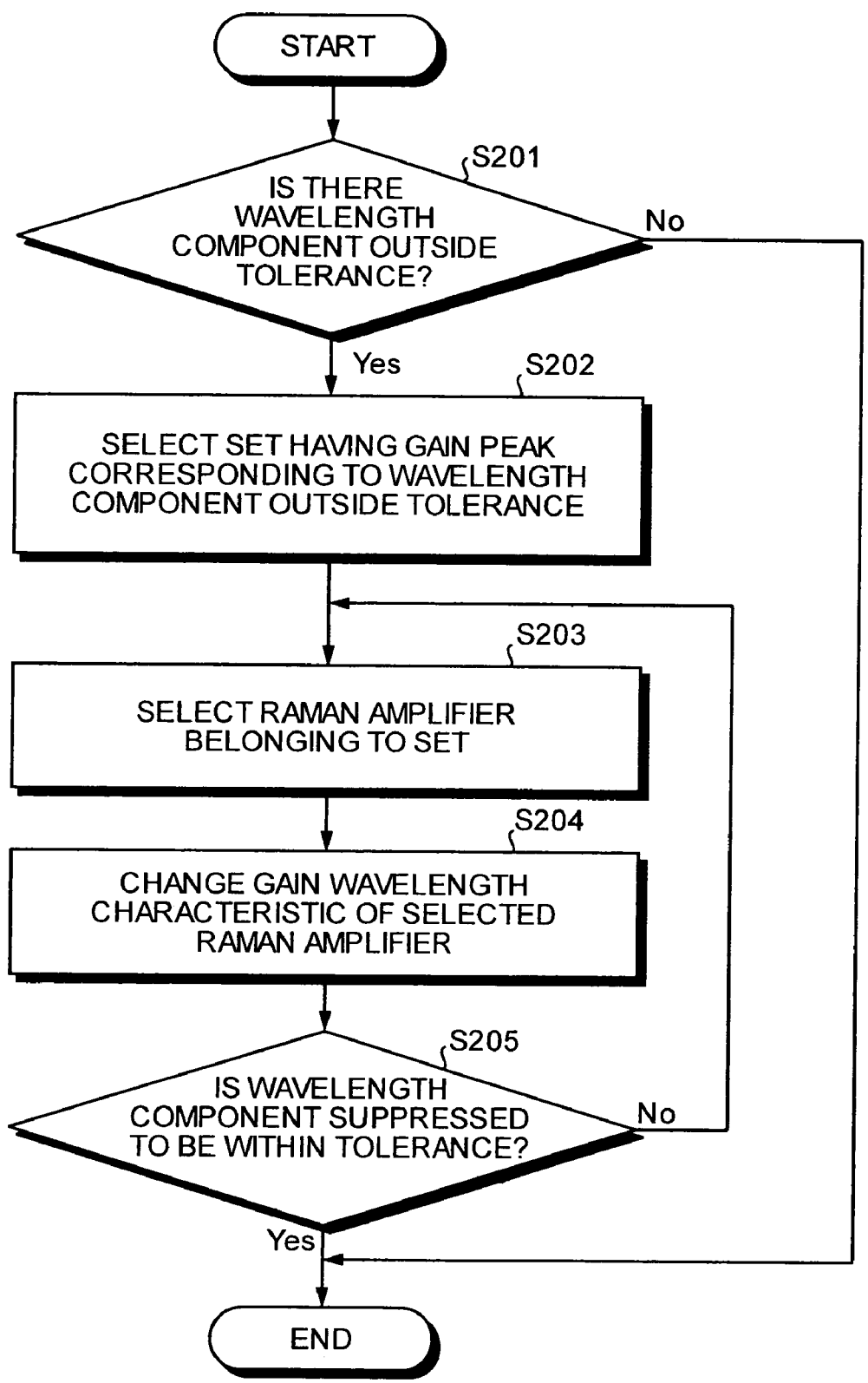
FIG. 20 is a flowchart of the operation of the entire gain controller in the Raman amplifying system according to the third embodiment.

The operation of the entire gain controller 26 will be explained next. FIG. 20 is a flowchart of the operation of the entire gain controller 26. The operation of the entire gain controller 26 will be explained with reference to the flowchart shown in FIG. 20.

At first, the entire gain controller 26 detects the presence of a wavelength component outside the tolerance with regard to the input amplified light, and when there is such a wavelength component, detects the wavelength thereof (step S201). Specifically, the lights amplified by the Raman amplifiers are branched for each predetermined wavelength component by the optical branching filter 29 shown in FIG. 19, and after being converted to an electric signal by the photoelectric transducers 30a to 30h, input to the control wavelength detector 32. The control wavelength detector 32 detects the presence of the wavelength component outside the tolerance, with regard to the intensity of the electric signals corresponding to the respective wavelength components, by referring to the information stored in the storage unit 31, and when there is such a wavelength component, detects the wavelength thereof. When a wavelength component outside the tolerance is not detected, the operation of the entire gain controller 26 finishes.

A set having a predetermined gain peak is then selected based on the wavelength of the detected wavelength component (step S202). Specifically, the storage unit 31 stores the information relating to the peak wavelength corresponding to the respective wavelength components of the amplified lights, and to which set the Raman amplifier having the peak wavelength belongs, and based on such information, an appropriate set is selected.

Thereafter, the entire gain controller 26 selects a Raman amplifier belonging to the selected set (step S203), to change the gain wavelength characteristic of this Raman amplifier (step S204). The Raman amplifier belonging to the set has substantially the same gain wavelength characteristic, and hence, an optional Raman amplifier belonging to the set is selected, to change the gain wavelength characteristic of the Raman amplifier. In the selected Raman amplifier, the temperature of the fiber gratings and the semiconductor laser devices and the electric current injected into the semiconductor laser devices are changed, to change the wavelength and the intensity of the gain peak. Thus, by changing the gain wavelength characteristic of the selected Raman amplifier, the gain wavelength characteristic of the entire Raman amplifying system changes.

The entire gain controller 26 then checks whether the intensity of the wavelength component detected at step S201 is reduced so as to be within the tolerance, with respect to the amplified light based on the changed gain wavelength characteristic (step S205). Specifically, the entire gain controller 26 checks the presence of a wavelength component outside the tolerance by the same method as at step S201. When there is such a wavelength component, control returns to step S203, to select another Raman amplifier belonging to the same set. When there is no wavelength component outside the tolerance, the operation of the entire gain controller 26 finishes.

The reason why an optional Raman amplifier belonging to a predetermined set is selected at step S203 is that the entire gain controller 26 detects a wavelength component outside the tolerance with respect to the amplified light at step S201, to determine to which set the Raman amplifier having such a wavelength component belongs, but cannot decide actually which Raman amplifier has such a wavelength component. Therefore, after specifying the set to be controlled, the entire gain controller 26 selects an optional Raman amplifier belonging to the set.

When the gain wavelength characteristic of the entire Raman amplifying system according to the third embodiment is disturbed, a possibility of abnormality occurring in a plurality of Raman amplifiers at the same time is low, and normally, the entire gain wavelength characteristic changes due to a trouble or the like in one Raman amplifier. Therefore, a possibility of selecting a Raman amplifier having the trouble or the like in the selected set is low, and by changing the gain wavelength characteristic of a normal Raman amplifier, a desired gain wavelength characteristic can be realized in the entire system. Even if the Raman amplifier selected at step S203 has a trouble or the like, and the gain wavelength characteristic of the entire system cannot be improved at step S204, the entire gain wavelength characteristic is checked again at step S205, to return to step S203 to select another Raman amplifier, thereby changing the gain wavelength characteristic.

The Raman amplifying system according to the third embodiment has the following advantages. That is, at first, since the Raman amplifying system has the entire gain controller 26, fluctuations in the gain wavelength characteristic of the entire system can be reduced, when abnormality occurs in the amplification gain wavelength characteristic of the Raman amplifier constituting the system. Therefore, even when the individual gain wavelength characteristic changes due to a trouble in a Raman amplifier constituting the Raman amplifying system or environmental conditions in the arranged place, a desired gain wavelength characteristic can be realized as the entire system. Furthermore, even when the wavelength intensity characteristic,of the input signal light deteriorates, an amplified light having a desired wavelength intensity characteristic can be output.

The Raman amplifying system according to the third embodiment has an advantage in that the entire gain wavelength characteristic can be controlled easily. Normally, in the optical communication system performing long-distance transmissions, the Raman amplifying devices are arranged with a predetermined distance from each other. Thus, when the Raman amplifying devices are arranged, a desired gain wavelength characteristic can be realized also by using the Raman amplifying device according to the first or the second embodiment. However, when the Raman amplifying system according to the third embodiment is used, control of the gain wavelength characteristic can be performed only by the entire gain controller 26 that controls the entire Raman amplifying devices (a plurality of groups in the third embodiment). Therefore, a Raman amplifying system at a lower cost can be realized.

Since control is performed by classifying the Raman amplifiers substantially by the same gain wavelength characteristic, to set up the sets 28a to 28n, the control becomes easy. Since the Raman amplifiers belonging to the respective sets have substantially the same gain wavelength characteristic, by changing the gain wavelength characteristic of an optional Raman amplifier belonging to the selected set, the gain wavelength characteristic of the entire system can be easily controlled.

The Raman amplifying system according to the third embodiment can have a configuration in which the amplification gain controller 7 explained in the first embodiment is provided at the end of the groups 21A to 24A. In this case, the gain wavelength characteristic in the Raman amplifying system can be controlled more easily by using two control mechanisms. For example, a Raman amplifier having a trouble can be uniquely determined by determining a set to which the Raman amplifier having the trouble belongs by the entire gain controller 26, and by determining a group to which the Raman amplifier having the trouble belongs by the amplification gain controller 7. In this case, since other Raman amplifiers belonging to the set to which the Raman amplifier having the trouble belongs can be reliably selected, selection of the Raman amplifier having the trouble can be avoided at step S203. Therefore, by performing the set control and the group control together, the Raman amplifier having the trouble can be quickly determined, and control of the gain wavelength characteristic of the entire system can be quickly performed.

As a specific arrangement of the Raman amplifiers used in the first to the third embodiments, a distribution type or a centralized type can be used. As the configuration for specifically detecting the gain characteristic, the gain characteristic can be detected based on the pump light output from the respective Raman amplifiers, or the gain characteristic can be detected based on the intensity distribution of the actually amplified signal light. Furthermore, in the second embodiment, the shift direction at the time of shifting the gain characteristic can be a positive direction or a negative direction. In the second embodiment, it is desired to increase the number of the pump lights in the respective Raman amplifier, that is, the number of gain peaks in the individual Raman amplifier. It is because by having such a configuration, the amplified wavelength (frequency) band is widened.

As explained above, according to the present invention, since the Raman amplifying device includes a plurality of Raman amplifiers, and the second gain peak is positioned between the adjacent gain peaks of the first Raman amplifier, the wavelength interval between the adjacent gain peaks can be optionally set as the entire Raman amplifying device. Furthermore, since the Raman amplifying device includes the amplification gain controller, a desired gain wavelength characteristic can be realized.

Furthermore, since the adjacent gain peaks are provided by different Raman amplifiers, the wavelength interval between the adjacent gain peaks can be made equal to or less than 6 nanometers, thereby flattening the gain wavelength characteristic, and making the control by the amplification gain controller easy and precise.

Moreover, according to the present invention, since the Raman amplifying device includes a Raman amplifier having a first gain characteristic, and a Raman amplifier having a second gain characteristic, which is shifted with respect to the first gain characteristic by a shift amount determined by performing sum approximation of periodic functions with respect to the first gain characteristic and based on the periodic distribution of periodic functions obtained from such approximation, the first gain characteristic and the second gain characteristic compensate for undulations, thereby enabling a flat gain characteristic as a whole.

Furthermore, according to the present invention, since the control of the gain wavelength characteristic is performed by a single entire gain controller with respect toga plurality of groups formed by the Raman amplifiers, control of the gain wavelength characteristic becomes easy.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A Raman amplifying device including a plurality of Raman amplifiers having a gain wavelength characteristic with a gain peak at which an amplification gain becomes the largest, the Raman amplifying device comprising:
    a first Raman amplifier having a gain wavelength characteristic with a plurality of gain peaks including a first gain peak and a second gain peak adjacent to the first gain peak;
    a second Raman amplifier having a gain wavelength characteristic with at least one gain peak including a third gain peak between the first gain peak and the second gain peak; and
    a third Raman amplifier having a gain wavelength characteristic with a fourth gain peak between the first gain peak and the third gain peak, the fourth gain peak forming an arithmetic sequence between the first gain peak and the third gain peak.

2. The Raman amplifying device according to claim 1, wherein a wavelength interval between adjacent gain peaks is 6 nanometers or less.

3. The Raman amplifying device according to claim 1, wherein a wavelength interval between adjacent gain peaks is 0.3 nanometer or less.

4. The Raman amplifying device according to claim 1, wherein a tolerance of the arithmetic sequence is substantially equal to a value obtained by dividing a mean value of the wavelength interval between the adjacent gain peaks obtained from the first Raman amplifier by number of the Raman amplifiers.

5. The Raman amplifying device according to claim 1, further comprising an amplification gain controller that controls the gain wavelength characteristics of the Raman amplifiers based on an intensity wavelength characteristic of a light amplified by the Raman amplifiers.

6. The Raman amplifying device according to claim 5, wherein
    the amplification gain controller includes a wavelength detector that selects a Raman amplifier having a gain peak closest to a wavelength of a wavelength component whose light intensity is deviated from a predetermined tolerance in the light amplified, and
    the amplification gain controller controls the gain wavelength characteristics of the Raman amplifiers in such a manner that the intensity of the light amplified is suppressed to within the tolerance by changing at least one of the wavelength of the predetermined gain peak and the peak intensity of the Raman amplifier selected.

7. The Raman amplifying device according to claim 1, wherein the Raman amplifiers include
    a plurality of semiconductor laser devices, each of which outputs a laser light; and
    an optical coupler that couples the laser beam emitted from each of the semiconductor laser devices.

8. The Raman amplifying device according to claim 7, wherein the amplification gain controller changes intensity wavelength characteristic of the laser light emitted from each of the semiconductor laser devices by controlling temperature of the semiconductor laser devices.

9. The Raman amplifying device according to claim 8, wherein the Raman amplifiers further includes a fiber grating that determines an emission wavelength of the semiconductor laser device.

10. The Raman amplifying device according to claim 9, wherein the amplification gain controller changes intensity wavelength characteristic of the laser light emitted from each of the semiconductor laser device by controlling temperature of the fiber grating.

* * * * *